(12) United States Patent
Hegedis et al.

(10) Patent No.: US 9,191,998 B2
(45) Date of Patent: Nov. 17, 2015

(54) MULTI COOKER

(75) Inventors: Tibor Hegedis, Rosebery (AU); David Davenport, Lane Cove (AU); Richard Hoare, Lane Cove (AU)

(73) Assignee: Breville Pty Limited, Alexandria, NSW (AU)

( * ) Notice: Subject to any disclaimer, the term of this patent is extended or adjusted under 35 U.S.C. 154(b) by 208 days.

(21) Appl. No.: 13/810,200

(22) PCT Filed: Jul. 15, 2011

(86) PCT No.: PCT/AU2011/000887
§ 371 (c)(1),
(2), (4) Date: Jan. 14, 2013

(87) PCT Pub. No.: WO2012/006674
PCT Pub. Date: Jan. 19, 2012

(65) Prior Publication Data
US 2013/0112683 A1 May 9, 2013

(30) Foreign Application Priority Data

Jul. 15, 2010 (AU) .................................. 2010903149

(51) Int. Cl.
*H05B 6/04* (2006.01)
*H05B 6/12* (2006.01)
*H05B 6/06* (2006.01)
*A47J 27/62* (2006.01)
*A47J 36/32* (2006.01)

(52) U.S. Cl.
CPC .................. *H05B 6/062* (2013.01); *A47J 27/62* (2013.01); *A47J 36/32* (2013.01)

(58) Field of Classification Search
CPC ........... A47J 27/62; A47J 36/32; H05B 6/062
USPC .................. 219/620–627, 660, 663, 664, 667
See application file for complete search history.

(56) References Cited

U.S. PATENT DOCUMENTS

| 3,786,220 | A | | 1/1974 | Harnden, Jr. | |
| 4,191,875 | A | * | 3/1980 | Cunningham | ................ 219/623 |
| 2004/0149736 | A1 | * | 8/2004 | Clothier | ........................ 219/627 |
| 2006/0118547 | A1 | * | 6/2006 | Alfredeen | ..................... 219/624 |
| 2008/0185376 | A1 | * | 8/2008 | Gagas et al. | .................. 219/623 |

FOREIGN PATENT DOCUMENTS

CN 2013223367 10/2009

* cited by examiner

*Primary Examiner* — Dana Ross
*Assistant Examiner* — Lindsey C Teaters
(74) *Attorney, Agent, or Firm* — Molins & Co. Pty Ltd.

(57) ABSTRACT

A cooking appliance and method, the appliance including: at least one temperature controlled heating element; a user interface for enabling a user to select a predefined subject for cooking; and a processor module that maintains a cooking data for cooking the selected predefined subject, and provides prompts to the user during cooking. The cooking data can be indicative of a cooking sequence or procedure. A cookware sensor can automatically identifying cookware being used.

18 Claims, 37 Drawing Sheets

600 —

Time Control

| TIMER | COUNT UP / COUNT DOWN |
| FINISH TIME | SET END TIME (ELAPSE OR CALENDAR TIME) |
| DELAY START | SET START AND END TIMES (ELAPSE OR CALENDAR TIME) |
| STIR REMINDER | SET TIME TO ALERT 'STIR' |
| TURN REMINDER | SET TIME TO ALERT 'FLIP/TURN' |
| AT FINISH | KEEP WARM - TURN OFF - SET ANOTHER TEMPERATURE? |
| SET CLOCK | 12/24 HR AND SET TIME ZONE |
| REST TIME | CAN BE LINKED TO FOOD COOKING MENU (RELATIVE TO MEAT TYPE/THICKNESS) |

| Cooking in any mode. User needs to leave cooktop unexpectedly | 'Pause/Return' Button | Unit reduces power to preset keep warm temp or user defined level. Limited by food safety standards (no less 54°C in 4 hrs) if meat. | On return, 'Pause/Return' Button will return to previous state |

FIG. 21B

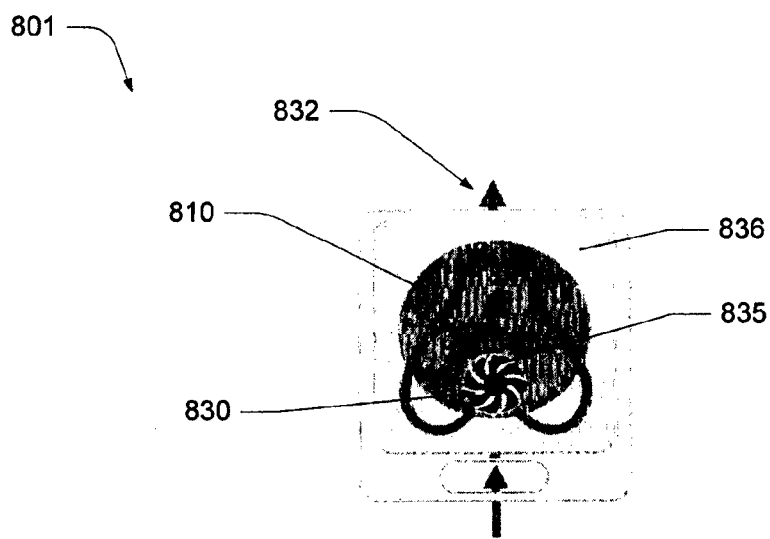
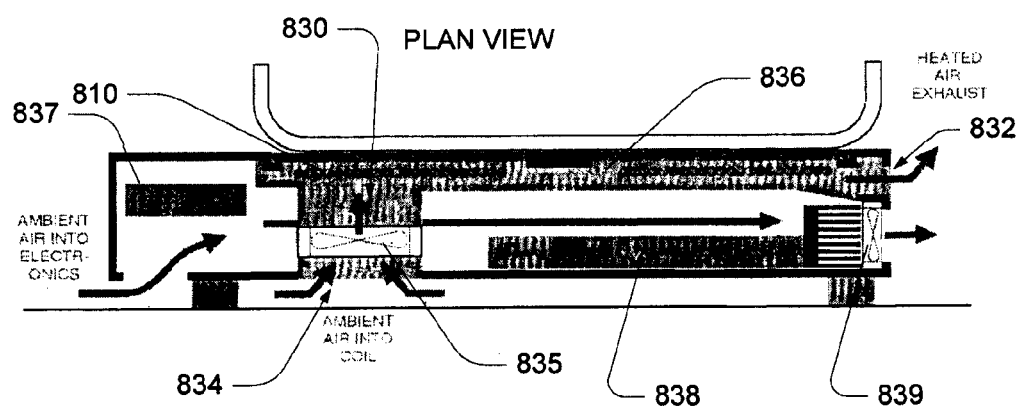
SECTIONAL SIDE VIEW
FIG. 23B

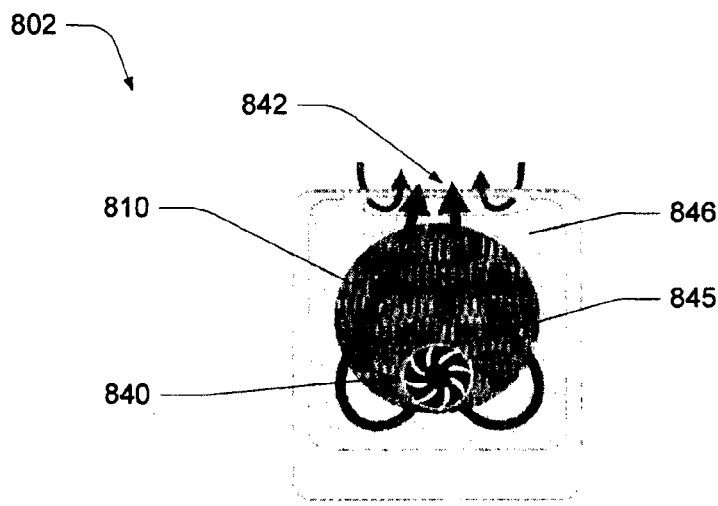
PLAN VIEW
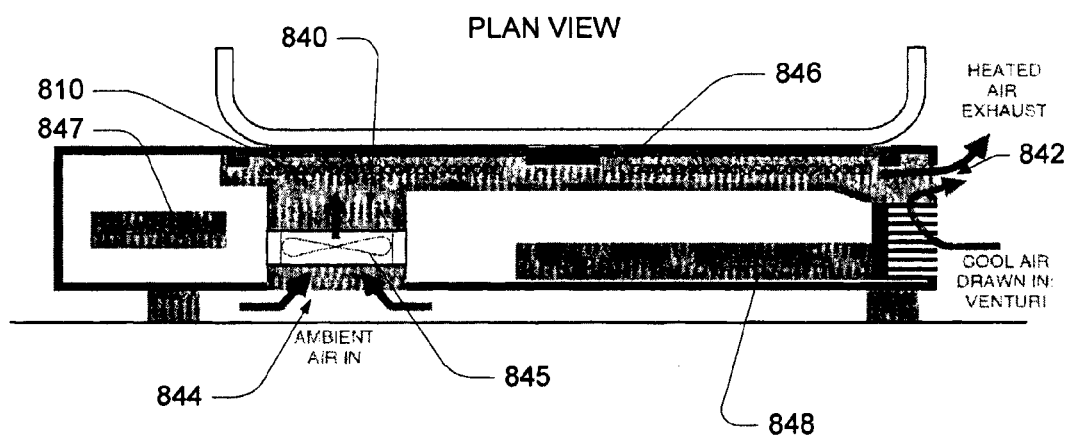
SECTIONAL SIDE VIEW
FIG. 23C

MULTI COOKER

FIELD OF THE INVENTION

The invention pertains to induction cooking and more particularly to an induction heating appliance that is adapted to be used with a variety of different cookware vessels.

The invention has been developed primarily for use as a multi-cooker and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Existing stove top cooking does not provide enough feedback to the user regarding the temperature of the food being cooked. User control over conventional food warming appliances also requires manual intervention in a number of different steps during the cooking process. In conventional heating appliances, accurate temperatures are sometimes difficult to set and there is little or no user feedback as to how the cooking process is progressing. Accordingly, conventional cooking methods are associated with inadequate results and uncertainty as to the expected outcome of a heating operation.

OBJECTS OF THE INVENTION

It is an object of the present invention to overcome or ameliorate at least one of the disadvantages of the prior art, or to provide a useful alternative.

It is an object of the invention in a preferred form to provide an induction food cooking appliance with sophisticated features that assist with the automation, ease, predictability and quality of the cooking process when compared with manual alternatives.

SUMMARY OF THE INVENTION

According to an aspect of the invention there is provided a cooking appliance, the appliance comprising:
  at least one temperature controlled heating element;
  a user interface for receiving a user input setting for cooking; and
  a processor module that maintains a cooking data for cooking in accordance with the user input, and can provides prompts to the user during cooking.

According to an aspect of the invention there is provided a cooking appliance, the appliance comprising:
  at least one temperature controlled heating element;
  a user interface for enabling a user to select a predefined subject or predefined cookware for cooking; and
  a processor module that maintains a cooking data (sequence or procedure) for cooking the selected subject, and provides prompts to the user during cooking.

Preferably, the cooking appliance includes a cookware sensor for automatically identifying cookware being used. More preferably, the processor module, upon identification of the cookware, can adjust the selected cooking sequence or procedure.

Preferably, the cooking appliance includes one or more a temperature sensors. More preferably, the cooking appliance includes one or more remote temperature sensors. Most preferably, the processor module receives data from the temperature sensors indicative of the cooking temperature and can adjust or control the temperature controlled heating element according to the selected cooking sequence or procedure.

According to an aspect of the invention there is provided a heating element as herein described. Preferably, the heating element is operatively associated with one or more temperature sensors. More preferably, the heating element is associated with a cooling assembly.

According to an aspect of the invention there is provided a processor apparatus for a cooking appliance, the apparatus comprising:
  a user interface for enabling a user to select a predefined subject or predefined cookware for cooking;
  a database of cooking data including a sequence or procedure for cooking the selected subject;
  wherein apparatus is adapted to display one or more prompts to the user during cooking.

According to an aspect of the invention there is provided a user access interface for a cooking appliance, the appliance comprising a processor apparatus being coupleable to a database having cooking data; the interface comprising:
  a control program adapted to receive user input for selecting a predefined subject or predefined cookware for cooking;
  the control program adapted to, in response to the user input, display one or more prompts to the user during cooking.

According to an aspect of the invention there is provided a method for controlling a cooking appliance as herein described.

According to a further aspect of the invention there is provided a computer readable medium for operation with a processor device, the computer readable medium comprising computer code for executing a method as herein described.

BRIEF DESCRIPTION OF THE DRAWING FIGURES

In order that the invention be better understood, reference is now made to the following drawing figures, in which:

FIG. 21A-FIG. 21B shows embodiment user interface settings associated with appliance timing control;

FIG. 23A-FIG. 23C show schematic views of embodiment induction coil cooling assemblies.

BEST MODE AND OTHER EMBODIMENTS

It will be appreciated that existing stove top cooking apparatus do not provide enough temperature feedback, user control and feedback. Specific cooking temperatures are typically difficult to set or maintain. There is little feedback for the user as to how the pot or cooking implement is reacting to the input of heat. This leads to user uncertainty, nervousness and can result in undercooked, overcooked or wasted food.

In an embodiment, a portable induction powered cooktop with one or more separate non electric cookware appliance vessels (for example Slow Cooker, Frypan, Grillpan, Kettle, Pot, Sous Vide or the like) can provides an operative relationship between the base and the cooking vessel. The induction base can recognize (automatically or by manual input from a user) the cookware appliance.

Figure 1:
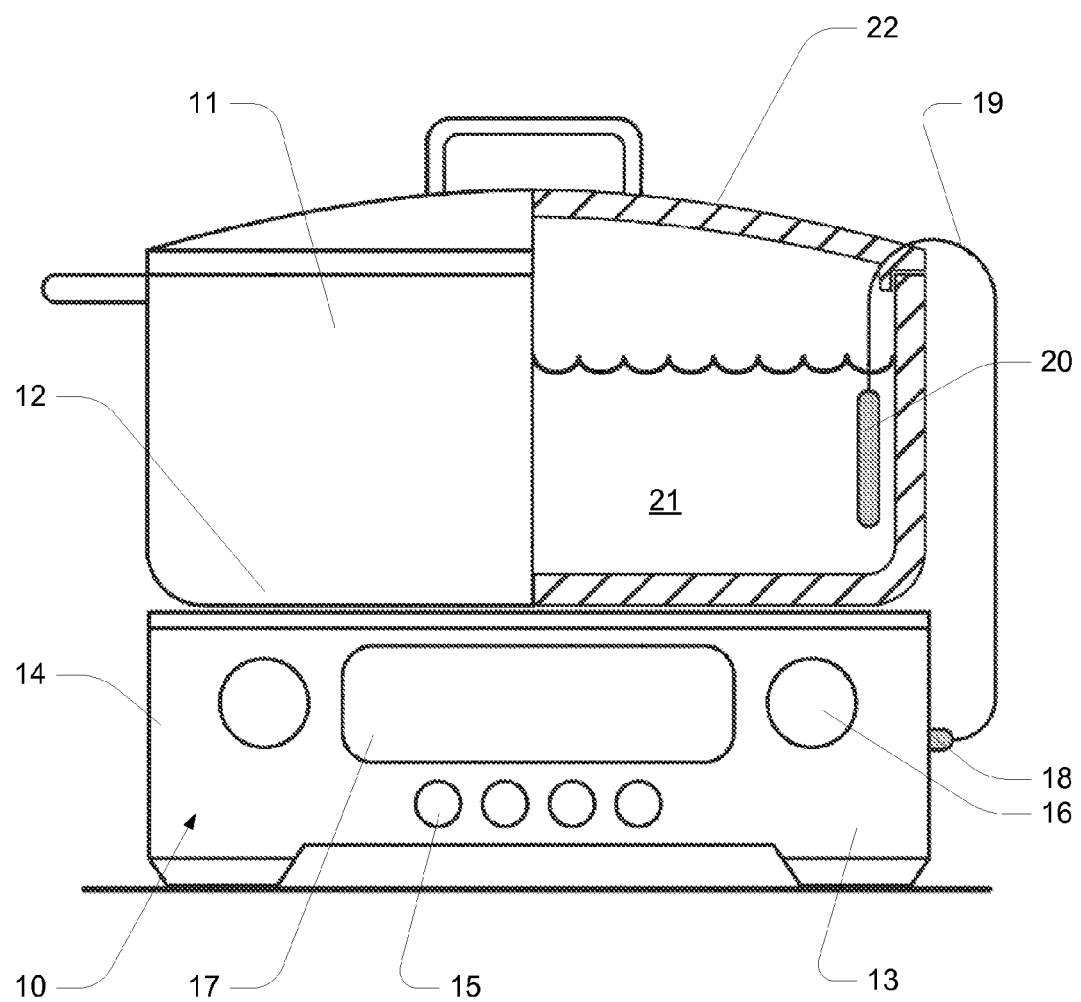
FIG. 1 is a partially cross section plan view of an induction cooker and a conventional pot utilised in accordance with the teachings of the present invention.

As shown in FIG. 1 a portable or counter top induction cook top appliance co-operates with non-electric cookware. In preferred embodiments the cooking appliance 10 has sensors and a micro processor which are able to recognise or identify automatically and without manual input from a user, the particular cookware 11 that occupies the upper, flat, cooking surface 12. In this way, a single induction powered appliance 10 can co-operate with a slow cooker, frypan, grillpan, kettle, pot, sousvide apparatus or other cooking vessel of the type adapted to be used with an induction coil based cooking apparatus. As will be explained, some embodiments of the invention are adapted to utilise conventional cookware or as other embodiments are particularly adapted to co-operate with specially configured cookware. Some embodiments of the invention provide an appliance 10 that can co-operate with conventional and specially adapted cookware. It will be appreciated that in an alternative embodiments, the induction cook top appliance can be built-in, of integrated with a domestic cooking appliance.

Figure 2A:
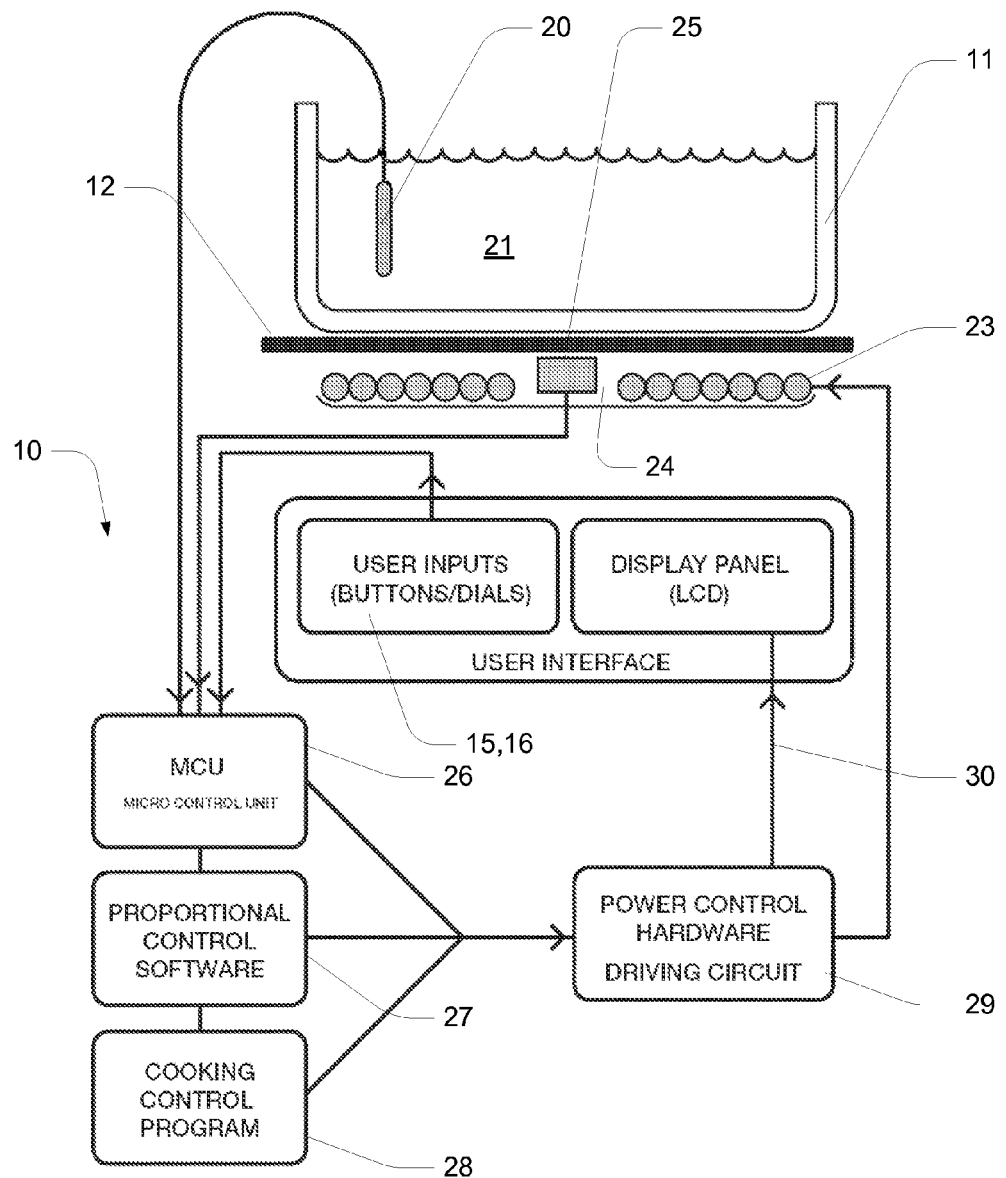
FIG. 2A is a schematic diagram illustrating the construction of an embodiment induction multi cooker in accordance with the teachings of the present invention.
Figure 2B:
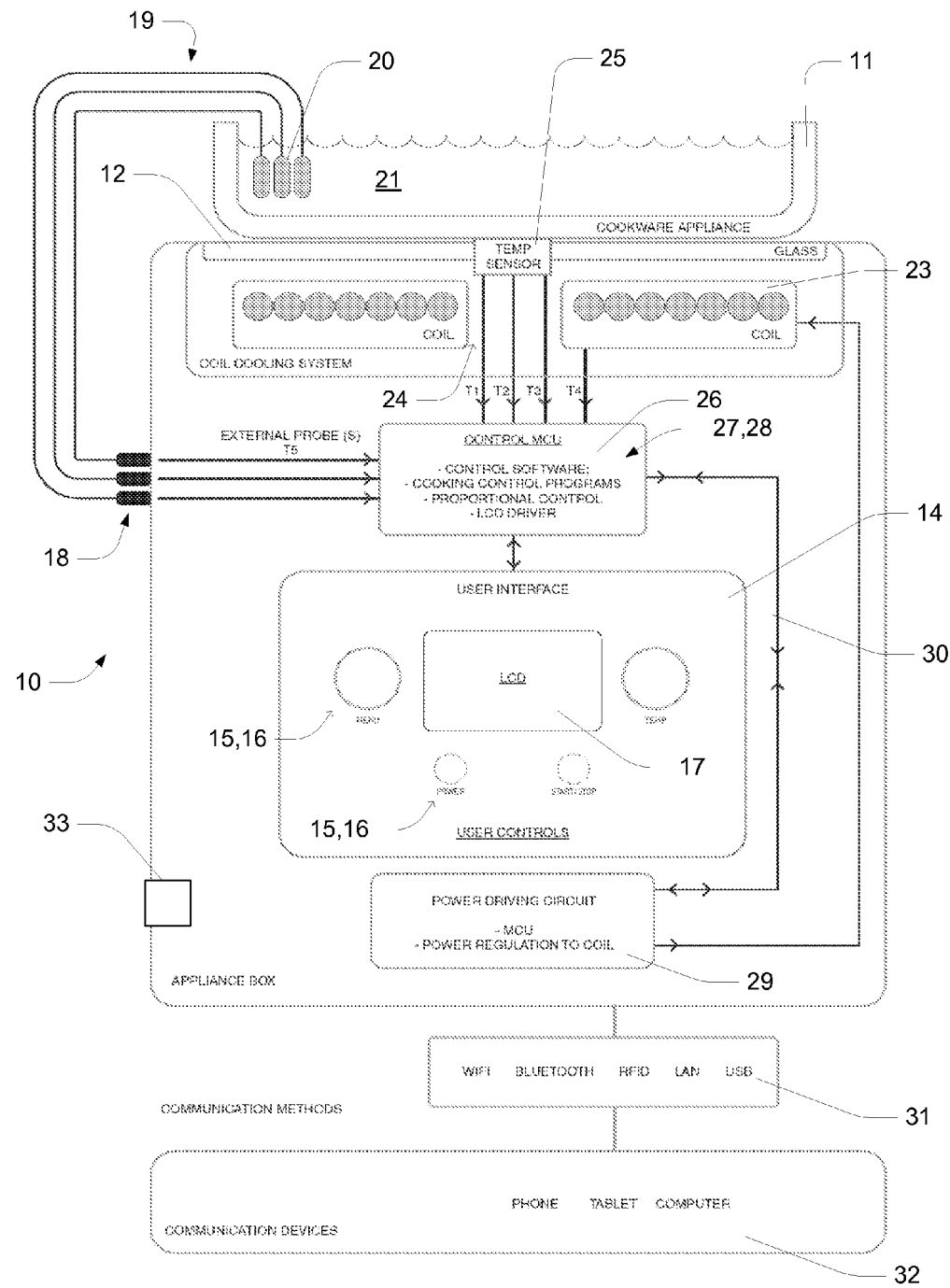
FIG. 2B is a schematic diagram illustrating the construction of an embodiment induction multi cooker in accordance with the teachings of the present invention.

As suggested by FIG. 1, FIG. 2A and FIG. 2B, and with reference to the utilisation of conventional cookware, an embodiment appliance 10 comprises a portable enclosure 13 having a user interface panel 14. The user interface panel provides a number of user input switches and controls 15, 16 and a display panel 17; by way of example only, in the form of a liquid crystal display a TFT display, a Fixed Segment display, an LED display, an OLED display, or similar. It will be appreciated if the invention may be implemented with a touch screen for providing both display information and user inputs. The enclosure 13 provides a optional socket 18 for receiving the electrical lead 19 of a thermal sensor 20. In the embodiment of FIG. 1, the sensor 20 is submersible in a food being cooked 21, even when the vessels lid 22 is on the vessel 11.

As shown in FIG. 2A and FIG. 2B, the appliance 10 comprises a cooking surface 12 below which is located an induction coil 23. The coil has a central opening 24 within which is located a second sensor 25. The first and second sensors 20, 25 co-operate with a micro processor or micro controller unit (MCU) 26. The micro controller 26 also receives inputs from the user operated switches and controls 15, 16. The MCU 26 co-operates with proportional control software 27 and a cooking control programme 28 to effect control over the power control hardware 29. The power control hardware 29 supplies power to the induction coil 23 and supplies information 30 to the display panel 17, that information providing feedback to the user regarding the users own selection of preferences using the user controls 15, 16, the progress of the cooking process and data as may be required regarding the cooking process. Other variations and embodiments will be disclosed below.

Proportional control software is used to give greater accuracy and control over cooking temperatures. Such proportional control regimes can be employed in particular temperature zones/ranges (for example 70-100 deg Celsius in 5 deg Celsius increments or 55-100 deg Celsius in 1 deg Celsius increments) to allow slow cooking, simmer and boil functions in ways that are considerably more accurate than conventional methods. It will be appreciated that other temperature ranges and increments can be specified or implemented. Proportional control software can restrict temperature overshoot which can result in overcooked food. It is not required that the temperature control software use proportional control throughout the entire cooking temperature range.

The MCU 26 can have or co-operate with solid state memory for the purpose of allowing the user to store favourite settings that can be easily returned to in subsequent cooking operations. Thus, particular setting can be remembered by pressing a user activated switch or button where upon the MCU will record the temperature data with respect to a particular piece of cookware so that a current operation can be repeated, with accuracy, after the current operation is actually completed. Thus, storing cooking information in this way provides the user with convenience and consistency.

The cooking control programme 28 can, for example, store or determine time and temperature profiles for the purpose of obtaining best cooking results. For example, in the example of a casserole, a user selected a 4 hour cooking time will obtain a different time and temperature profile than a user selected a 6 hour cooking time. In the instance of a 6 hour cooking time, the "heat up" time will be slower than the 4 hour time, resulting, in better softening of the connective tissue and muscle fibres in meat—thereby tenderising and forming gelatine.

The MCU 26 and its memory may also be used to obtain, record and store a heat profile of a particular item of cookware. This can be done, for example, by adding a fixed quantity such as one liter of water to a pan and measuring the temperature of the water or the vessel as power supply to the induction coil. The resulting temperature and time profile is indicative of the thermal mass (or a Heat Saturation Point) of the cookware. The resulting heat and time profile provides a "signature" of the cookware that can be interpreted and used by the MCU and subsequent cooking operations. A user can assign a name to this cookware signature for subsequent recall.

A particular piece of cookware suitable for induction heating, when new, may be supplied with an update device that can supply the MCU with programmes and parameters that apply to the cookware. The update device may be an RFID tag associated with the cookware or, for example, a USB memory stick device that contains programmes, data or other information that is particular to the vessel. This information can be downloaded to the MCU storage by plugging the USB memory into the appliance's USB interface or port. It will be appreciated that this information can be downloaded to the USB device from a data networks (e.g. the Internet) for uploading to the appliance.

It would be appreciated that an embodiment apparatus can provide connectivity to the Internet or home network for enabling updating of software. The software updates can include any one or more of the following: software improvements, new products, new recipes, or control to enable consumers to 'upgrade' their cookware.

One of the advantages of the present invention is that the presence of the MCU 26 allows data about the cooking process to be collected and utilised. Data can be collected from remote probes or from specially adapted vessels and their components. For example, the lid and handles of a vessel can be interchangeable, removable, and optionally equipped with temperature, pressure or other sensors. The lid of a vessel may be formed from cast iron and may incorporate a transparent window. The lid may have sufficient weight and a polymeric seal for promoting high pressure cooking when the lid is on. A lid may also be provided with openings or ports through which a probe may be inserted. Similarly, a vessels handles can be detachable and provided with sensors, stored information and means for wirelessly transmitting information to the MCU 26.

As best shown in FIG. 2B, the control MCU 26 can receive a plurality of data signals. The data signals can be indicative of temperature measured by: a respective one of a plurality of external temperature sensors 20 located within the cooking vessel 11; and/or a respective one of a plurality of fixed mounted temperature sensors 25 located proximal to the cooking coils 23.

It will be appreciated that the cooking apparatus can include communication methods 31 (or software) for enabling communication with a remote device 32. This communication with a remote device can enable one of more of the following:

Updating software/firmware;
Diagnostics;
Customising a user interface
Communicating with an remote device;
Communicating with a wireless or wired systems—for example Bluetooth, WiFi, LAN, USB cable etc
Interfacing with any wireless device that can run an application and communicate.

In an embodiment, cookware can include "Cooltouch" Cast Handles. In an embodiment, cookware can enable interconnection with remote temperature probe, position, locking. A lid rest can be provided for enabling condensation to drip back into cookware.

In an embodiment, the appliances enclosure may be provided with a switched or unswitched power outlet 33 for the purpose of driving other devices. The outlet may be AC or DC, and used to power appliances such as a whisk, automatic pot stirrer, hand mixer or masher.

Figure 3:
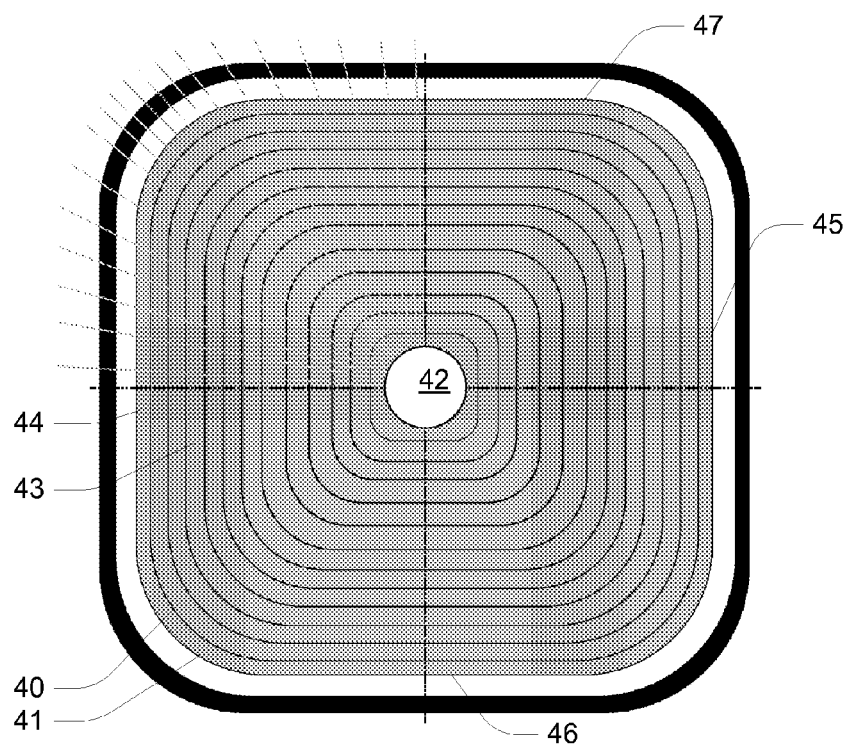
FIG. 3 is a plan view of a generally square induction heating coil.

As shown in FIG. 3, an induction coil 40 can be formed in the shape of a quadrilateral which is a square with rounded corners 41. The coil 40 has a central opening 42 surrounded by a conductive, spiral, inductor 43. In this embodiment, the inductor 43 has pairs of parallel sides 44, 45, and 46, 47. The bend radius of the similar corners 41 is optimised for the induction heating process. This induction coil is suitable for substantially square cookware having a base dimensions of about 310 mm wide by 310 mm long. It will be appreciated that other sized and shaped cookware can be used.

Figure 4:
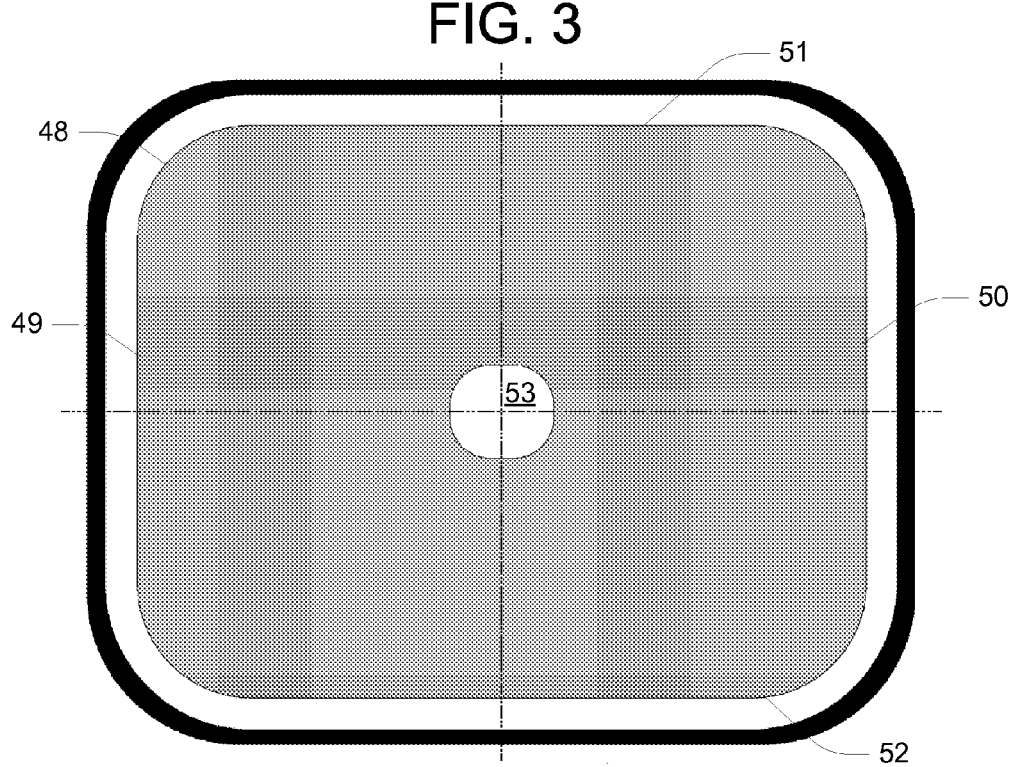
FIG. 4 is a schematic plan view of a rectangular induction heating element.

FIG. 4 illustrates a second embodiment of a generally quadrilateral induction coil 48. In this example, the pairs of parallel sides 49, 50 and 51, 52 are of unequal lengths. Further, the central opening 53 has peripheral flat spots that are generally parallel with the side edges of the coil. This coil 48 is not constructed with offset curves. By way of example only, this rectangular shaped coil can have peripheral dimension of about 275 mm wide by 350 mm long, suitable for substantially rectangular cookware having a base dimensions of about 305 mm wide by 380 mm long. It will be appreciated that other sized and shaped cookware can be used.

Figure 5:
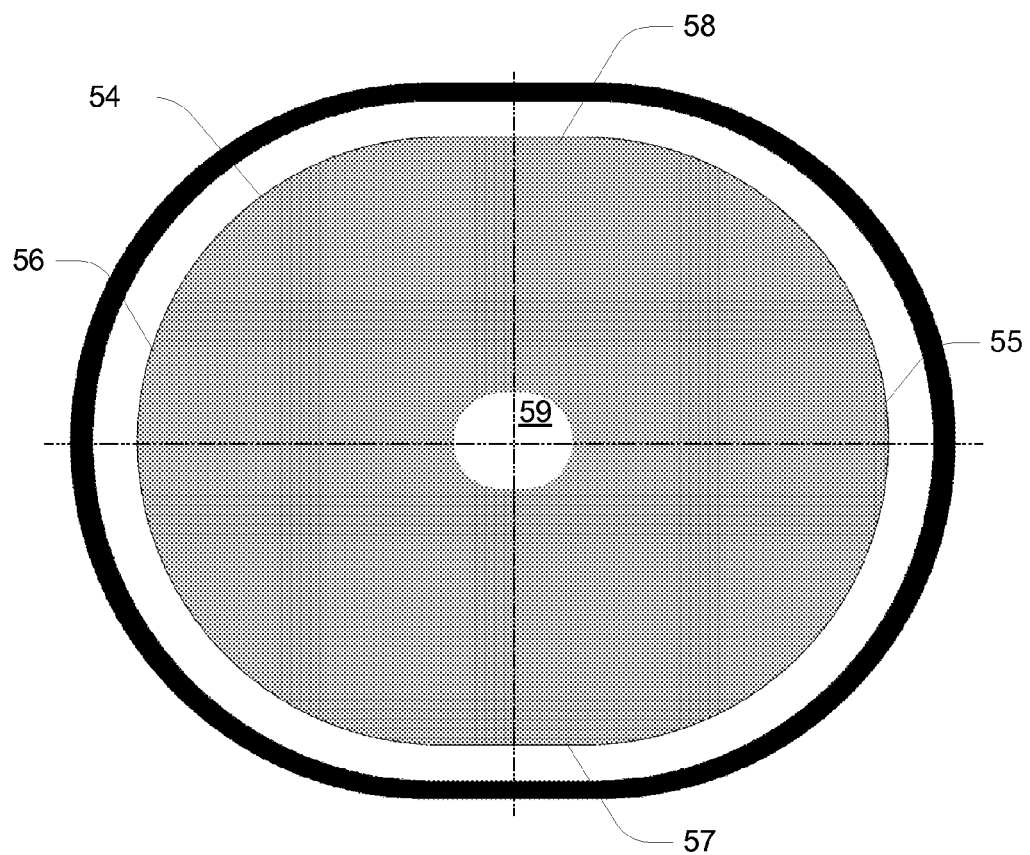
FIG. 5 is a schematic plan view of an oval induction heating element.

Another embodiment of a non-circular induction heating coil 54 is depicted in FIG. 5. In this embodiment, the longitudinal ends 55, 56 have equal radii and there are a pair of parallel transfers peripheral sides 57, 58. The shape of the central opening 59 corresponds to the peripheral shape of the coil 54. By way of example only, this lozenge shaped coil can have peripheral dimension of about 275 mm wide by 350 mm long, suitable for substantially lozenge shaped cookware having a base dimensions of about 305 mm wide by 380 mm long. It will be appreciated that other sized and shaped cookware can be used.

Figure 6A:
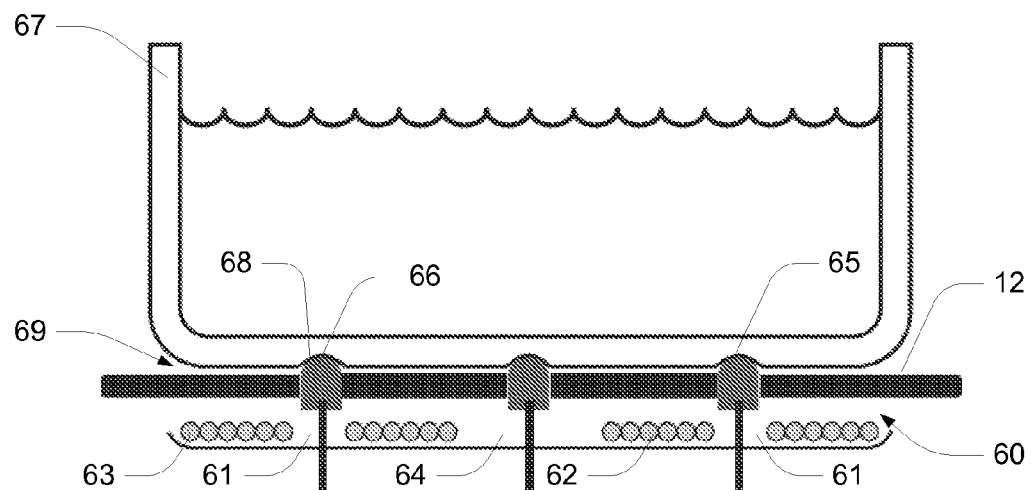
FIG. 6A is a schematic cross section of an induction appliance and cooking vessel.
Figure 7:
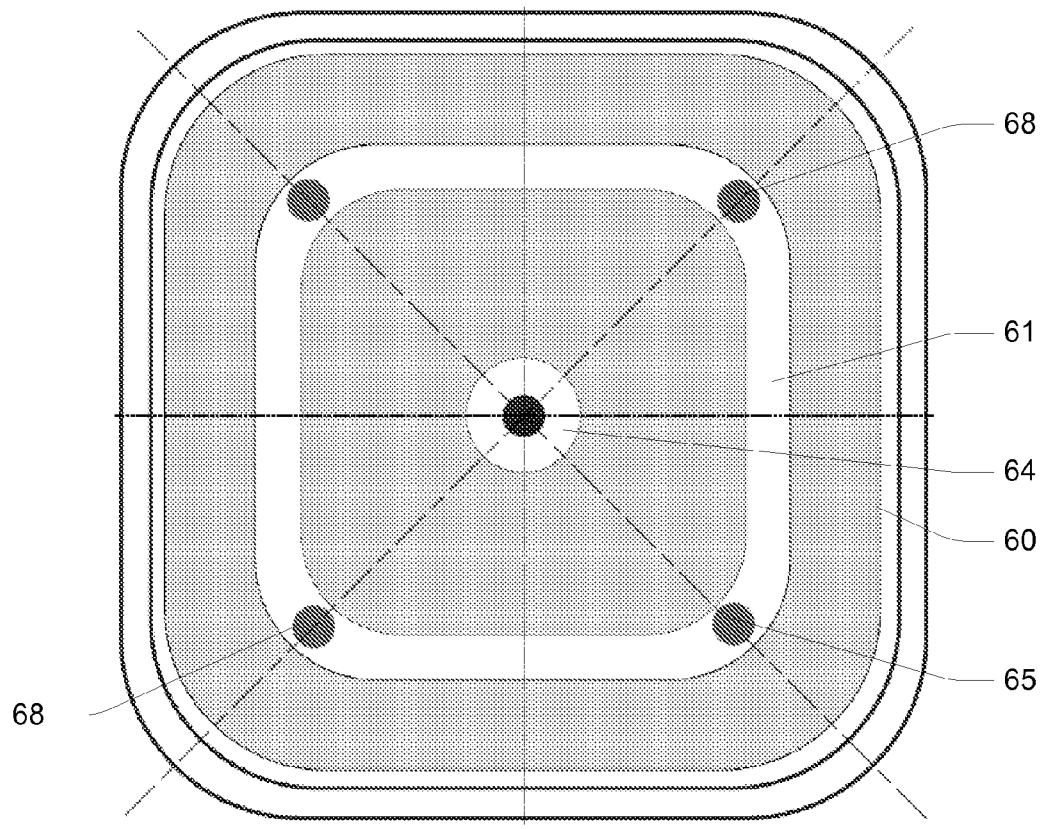
FIG. 7 is a schematic cross section through the device depicted in FIG. 6A.

Yet another embodiment of a quadrilateral or non-circular induction heating element is depicted in FIG. 6A and FIG. 7. In this example embodiment, the overall external shape of the coil is square with rounded corners, but there is a gap 61 located between an inner portion 62 and an outer portion 63 of the coil. In this example, the presence of the gap 61 and the central opening 64 allows a plurality of temperature sensors (5 in this example) to protrude through the coil 6o and through the upper surface 12. In this example, each of the temperature sensors 65 present a rounded or domed upper surface 66 that protrudes above the upper surface 12. In this example, the cooking vessel 67 has grooves or indentations 68 that accommodate the sensors 65. The depth of the grooves or indentations 68 is less than the height of the sensor 65 above the upper surface 12. Thus, when the vessel 67 is seated on the sensors 65, there will be an air gap 69 between the bottom of the vessel and the upper surface 12. The arrangement of rounded or domed top and co-operating groove or indentation in the vessel creates a positive mechanical engagement between the appliance 10 and the vessel 67, optionally provides a way of accurately locating the vessel 67 with respect to the induction coil 60 and provides intimate thermal contact between the sensors 65 and the vessel 67.

In an embodiment, the temperature sensing elements 65 are fixed in position, and protrude from the upper surface. The air gap defined, for example, is about 5 mm. It will be appreciated that the outer temperature sensing elements 68 can be used to locate the cookware.

Figure 6B:
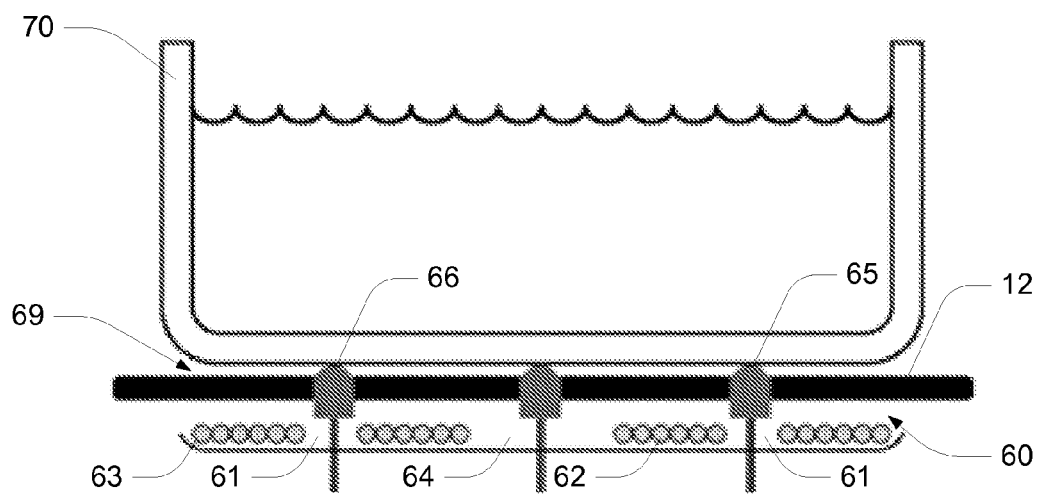
FIG. 6B is a schematic cross section of an induction appliance, shown used with a cooking vessel.

It will be appreciated that, as shown in FIG. 6B, having raised temperature sensing elements 65 and/or raised locating pins within a cook top can hold cookware 70 away from cook top surface (for example, 5 mm above the cook top). This enables the cook top to remain relatively cooler, further keeping internal components cooler (in particular, but not limited to, the coil element such as a Copper Litz Wire Coil) and making temperature sensing more efficient and/or accurate. It will be further appreciated that raised locating pins could also be used as additional temperature sensing points.

Figure 8A:
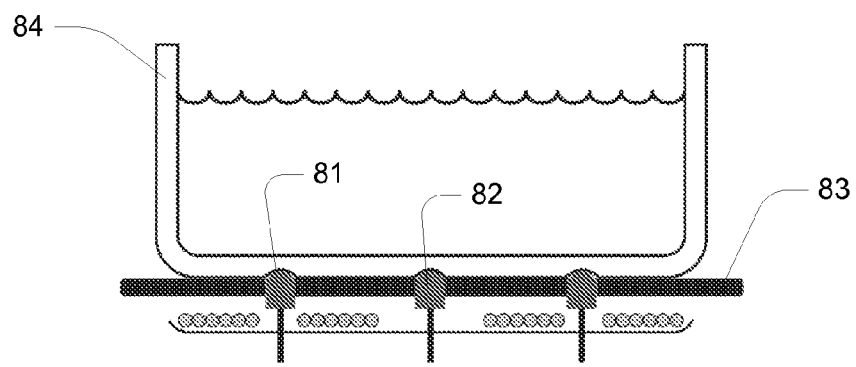
FIG. 8A is a schematic cross section through another embodiment of induction cooker and pot.
Figure 8B:
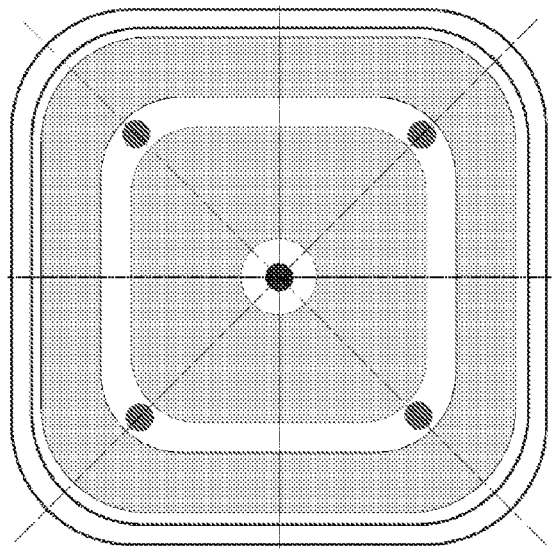
FIG. 8B is a cross section through the device depicted in FIG. 8A.
Figure 8C:
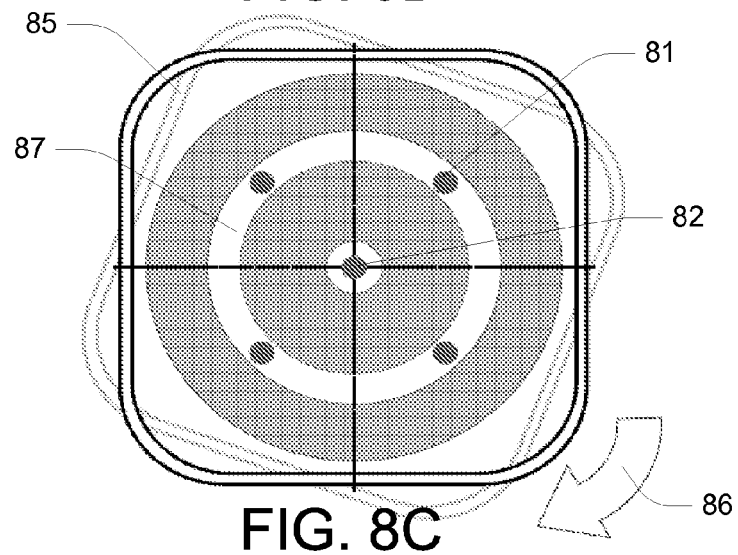
FIG. 8C is a cross section through a second embodiment of a combination of induction cooker and cooking vessel.

As shown in FIG. 8A when the groove or indentation in the vessel 81 is a deep or deeper than the height of the sensor 82 above the upper surface 83, then the vessel 84 will make planer contact with the surface 83. As suggested by FIG. 8B and FIG. 8C, a cooking vessel, whether circular or not, maybe provided with a concentric circular groove 87 on its under surface 85. When the radius of the groove 87 is equal to the effective radial distance of the sensor 81 to the centre of the coil 82, the vessel 84 will be free to rotate 86 about the centre 82.

As discussed with reference to FIG. 6 through FIG. 8, this arrangement can facilitate the location of cookware with respect to the induction coil, assist in elevating the cookware during the cooking process to create an insulating air gap between the cookware and the upper surface and thus assist in keeping the upper surface 12 to a minimum temperature. It will be appreciated that, by way of example only, raising of the cookware can be achieved by use of a non-conductive 'trivetts', 3 dimensional raised protrusions in the formed glass cooking surface or a silicon mat.

As shown in FIG. 9A through FIG. 9G illustrate alternative arrangements for mounting the central thermal sensor with respect to the upper surface 12 of the appliance 10.

Figure 9A:
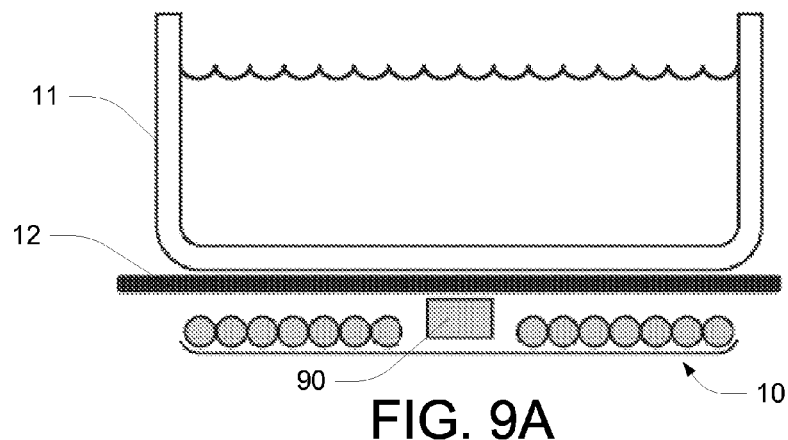
FIG. 9A-FIG. 9H illustrate different embodiments of temperature sensing elements working in association with a cooking surface on an induction multi cooker.
Figure 9B:
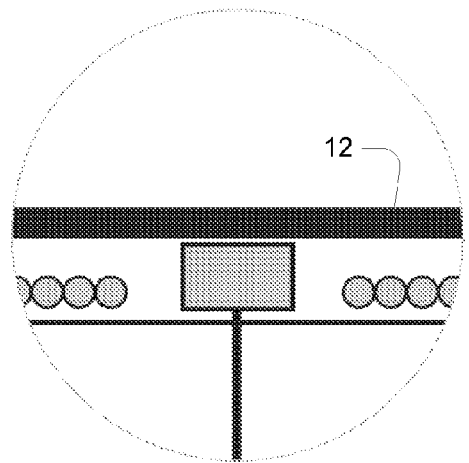

As suggested by FIGS. 9A (and 9B) the central thermal sensor 90 is located below the upper surface 12 and within the central opening of the induction coil. Temperature indicated by the electrical output of the sensor 90.

Figure 9C:
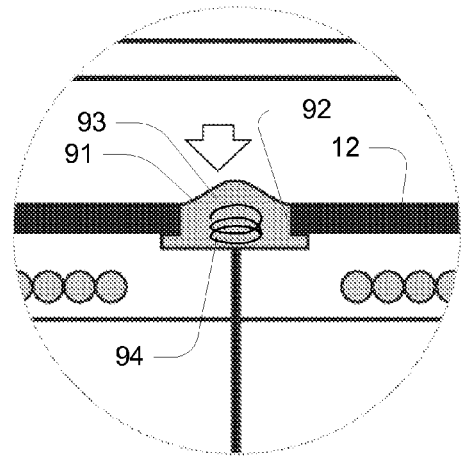

As shown in FIG. 9C, the central or other temperature sensor or sensors 91 can protrude through an opening 92 in the upper surface 12. In this example, a thermistor 93 is mounted onto a compression spring 94 so that the weight of a cooking vessel will cause the spring 94 to compress so that the sensor is flush with the upper surface 12 when a vessel is above it.

It will be appreciated that the purpose of a non-circular induction coil is to accommodate and optimise the utility of non-circular cookware. For given size appliance 10 it would be appreciated that the maximum cooking areas provided when the cooking vessel is either square or rectangular. Thus the promotion of even heating and cooking space efficiency is promoted when the size and shape of the induction coil is similar to the size and shape of the largest cooking vessel that will be used in conjunction with the appliance 10.

Figure 9D:
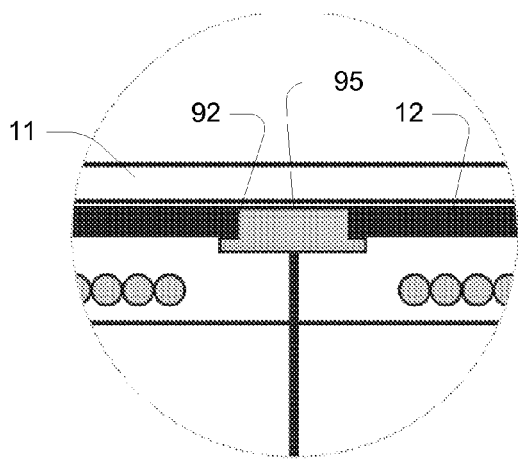

As shown in FIG. 9D, the sensor 95 can be flush at all times with the upper surface 12 owing to the opening 92 in the upper surface 12 into which the sensor is introduced.

Figure 9E:
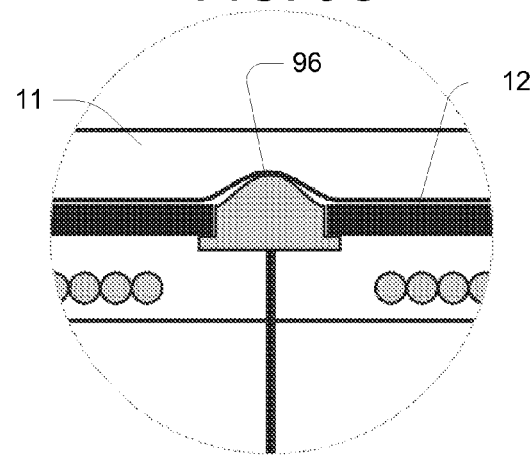

As shown in FIG. 9E, the sensor 96 may be fixed (not spring loaded 94) and still protrude above the upper surface 12.

Figure 9F:
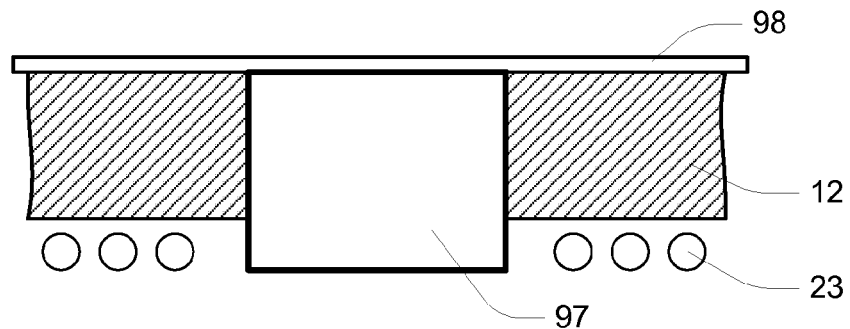

As shown in FIG. 9F, the sensor 97 may can be flush with the upper surface 12, owing to the opening in the upper surface into which the sensor is introduced. The cooking apparatus includes a relatively thin layer of silicon 98 extending over the upper surface and sensor. It will be appreciated that this can provides a relatively smooth surface for cleaning.

Figure 9G:
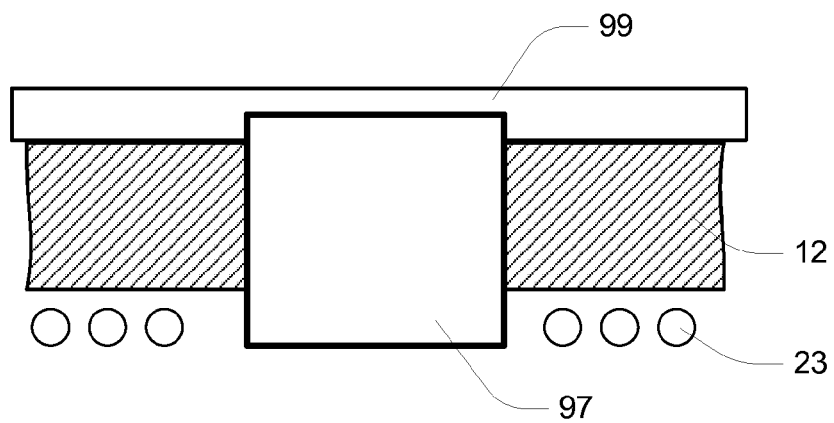

As shown in FIG. 9G, the sensor 97 may can protrude though the upper surface 12, owing to the opening in the upper surface into which the sensor is introduced. The cooking apparatus includes a layer of silicon 99 extending over the upper surface and sensor. The sensor protrude though the upper surface 12, and into the layer of silicon 99. It will be appreciated that this can provides a relatively smooth surface for cleaning.

Figure 9H:
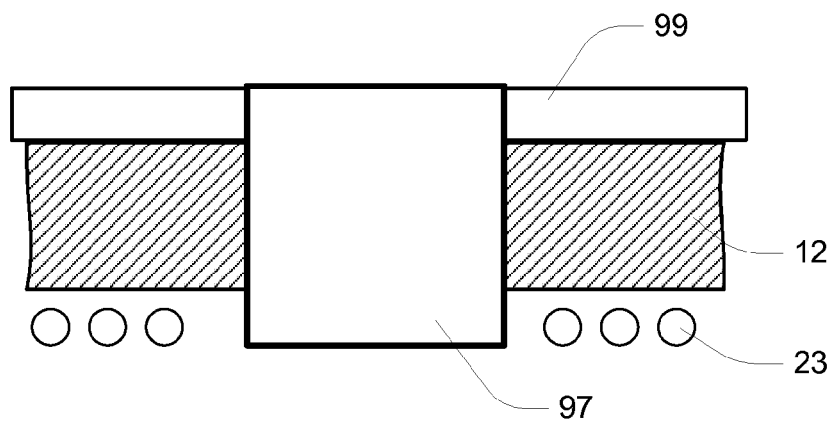

As shown in FIG. 9H, the sensor 97 may can protrude though the upper surface 12, owing to the opening in the upper surface into which the sensor is introduced. The cooking apparatus includes a layer of silicon 99 extending over the upper surface and sensor. The sensor protrude though the upper surface 12, and though the layer of silicon 99.

In an embodiment, a sensor mounted 'within' or 'though' the upper cooking surface, can protrude through a aperture therein, and a silicon or aluminum cover can be place atop the sensor to fit flush with the top surface and/or seal the aperture. By way of example only, the upper cooking service can be a glass cooking surface or a ceramic cooking surface.

Figure 10A:
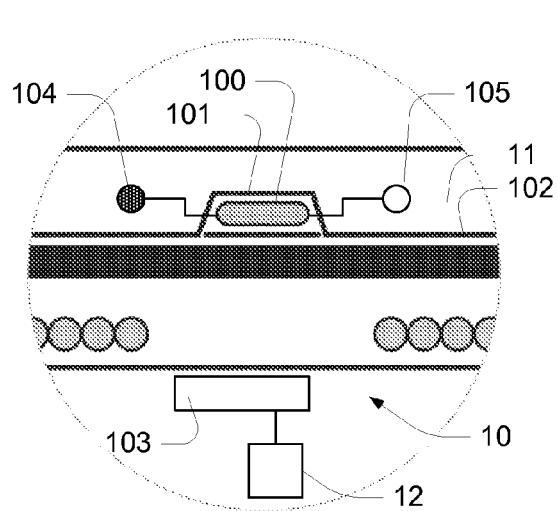
FIG. 10A is a schematic cross section through a cooking vessel incorporating an RFID tag.

As shown in FIG. 10A, the co-operation and communication between a vessel 11 and the induction appliance 10 of the present invention can be enhanced by providing the vessel 11 with an RFID transducer 100. The transducer 100 may be applied to the surface of, or embedded, within the vessel 11. In this example, the transducer 100 is located within a cavity 101 located on a lower surface 102 of the vessel 11. The RFID tag 100 is adapted to co-operate with a tag reader 103 located within the appliance 12 and co-operating with the MCU 26. The RFID tag may have a memory for storing an identity or information about the vessel 11 into which it is embedded or associated with. Further, the vessel 11 may be provided with its own temperature sensor or sensors 104 as well as other sensors 105. Information received from the one or more sensors 104, 105 can be transmitted from the RFID tag 100 to the RFID transceiver 103. In this way, information regarding temperature or other parameters associated with the cooking process can be provided from an individual vessel 11 to the appliance 10. Further, information contained in the tags memory can then be utilised by the cooking control programme and proportional control software to optimise the operation of the appliance 10, primarily by utilising this information to control the way that powers provided to the induction coil. Information from the RFID tag 100 or the sensors 104, 105 can also be displayed to the user on the display panel 17.

Figure 10B:
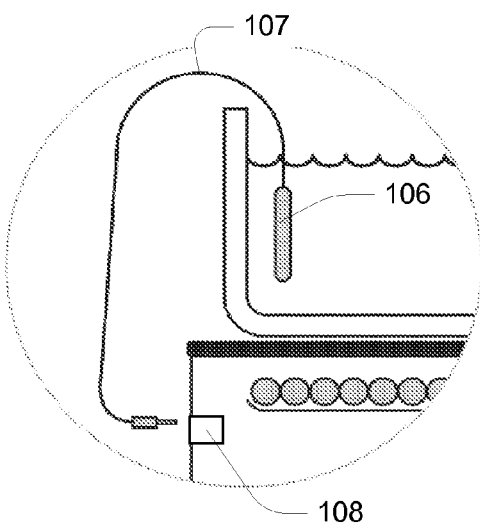
FIG. 10B-FIG. 10D illustrate different embodiments of devices for measuring food temperature in conjunction with an induction multi cooker.
Figure 10C:
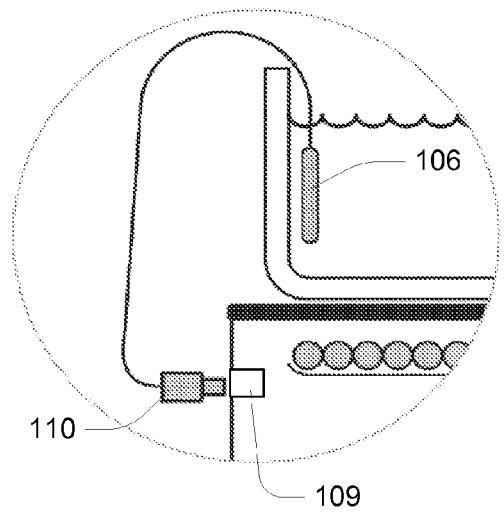
Figure 10D:
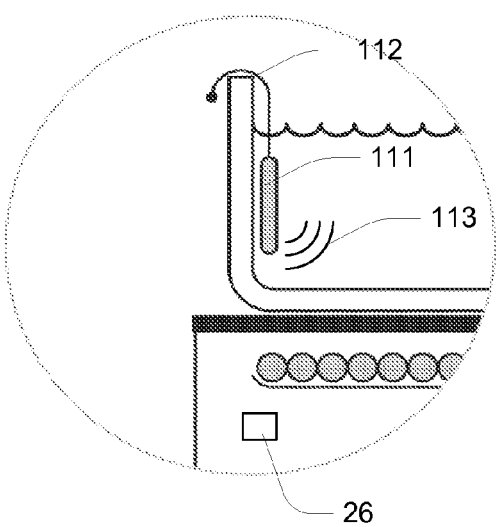

As shown in FIG. 10B, information such as temperature information can also be collected by a submersible temperature probe 106, connected by a wire 107 to a jack point 108 located on the appliance 10. The appliance may also incorporate a USB port 109 adapted to receive a USB plug 110 associated with a temperature sensor 106. As shown in FIG. 10D, the temperature sensor 111 may be suspended from the rim of a vessel by a rigid or semi-rigid hook 112. In this way, wireless communication 113 between the probe in and the MCU 26 can occur for example, as an exchange of any one or more of blue tooth, RFID or WI-FI signals.

The thermal or other cooking probes may be powered or charged by induction by placing the device on top of, close to or within the appliances enclosure. It can optionally use the primary induction power coil to charge the batteries in the probe.

Figure 11:
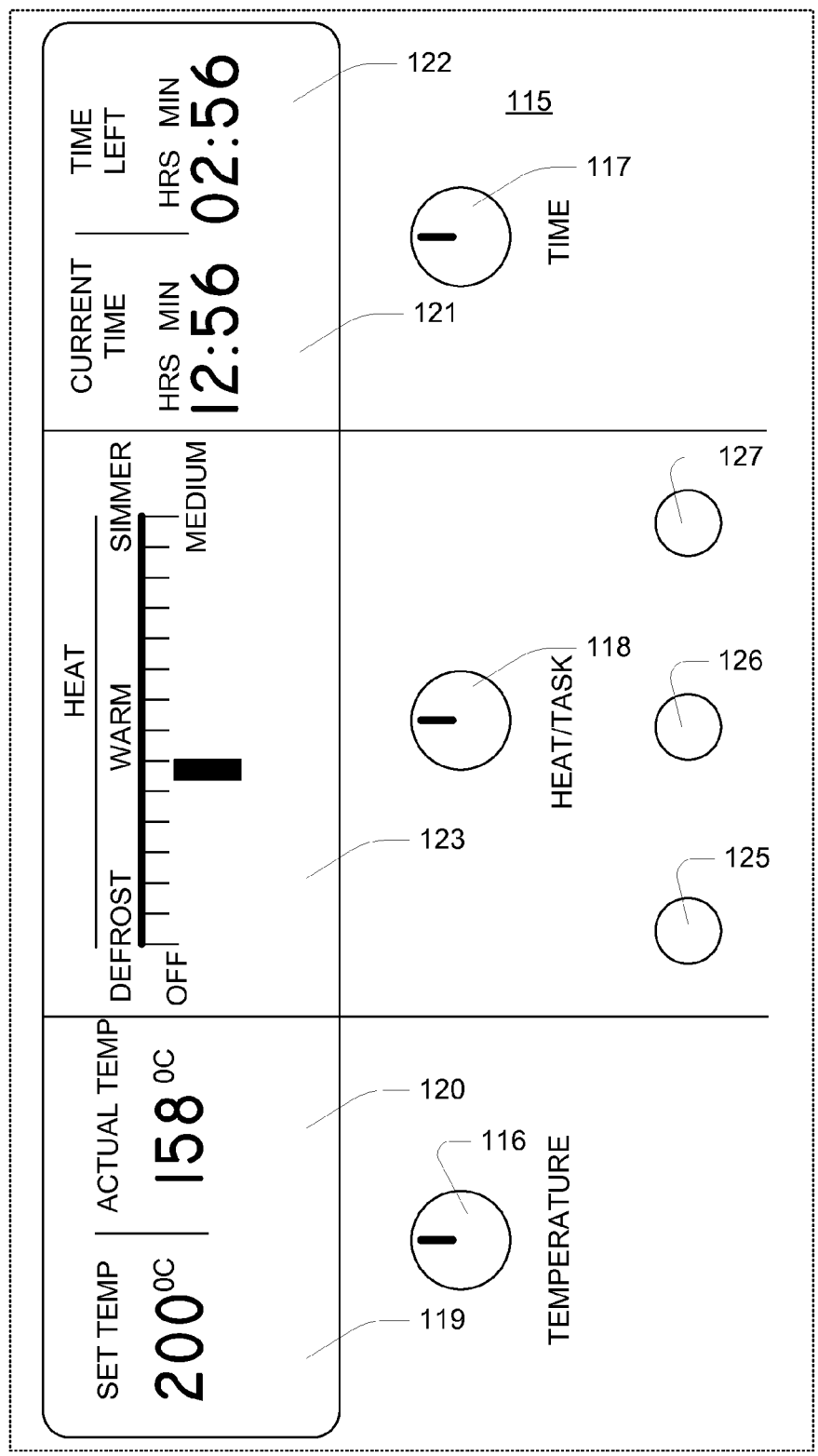
FIG. 11 is a schematic representation of a user interface panel for an induction multi cooker.

A basic user interface panel 115 is shown in FIG. 11. The panel incorporates rotating user inputs or temperature 116, time 117 and heating intensity or heat task 118. The display indicates the user selected temperature 119, the actual temperature 120, the current actual time 121 and the time remaining in the cooking process 122. A central part of the display 123 provides visual feedback regarding the selections made by the user.

In an embodiment, by way of example only, one or more input control elements (125, 126, and 127) can be included to provide input data to control software and/or a cooking programme. Input data can be indicative of a set point to recalibrate a cooking process (for example, a user preferred simmer temperature).

A user can pre-set time and temperature settings that are to their personnel liking. Thus, the appliance can obtain and store one or more custom settings that can be recovered at later time for cooking operations that are performed repeatedly by a particular user. By way of example only, low temperature settings, as may be used for soaking or sprouting beans or legumes may be provided.

Because the appliance 10 is intended to be used with a variety of cookware, particular controls, such as user selectable temperature controls may be provided by a dial with variable step or variable index control of the dial. For example, the same dial may provide different user feedback in different cooking regimes. In first regime, the dial can provide three settings, low, medium, and high. The settings will be detectable by the user through touch feedback through the dial itself or by the indication provided on the display. However, in a different or second cooking mode, the same dial could provide ten index settings that are detectable by the user either by touch feedback or through visual display. In some embodiments the resistance applied to the user control can be modified so as to provide different resistance to a turning force exerted by the user on the control.

Figure 12:
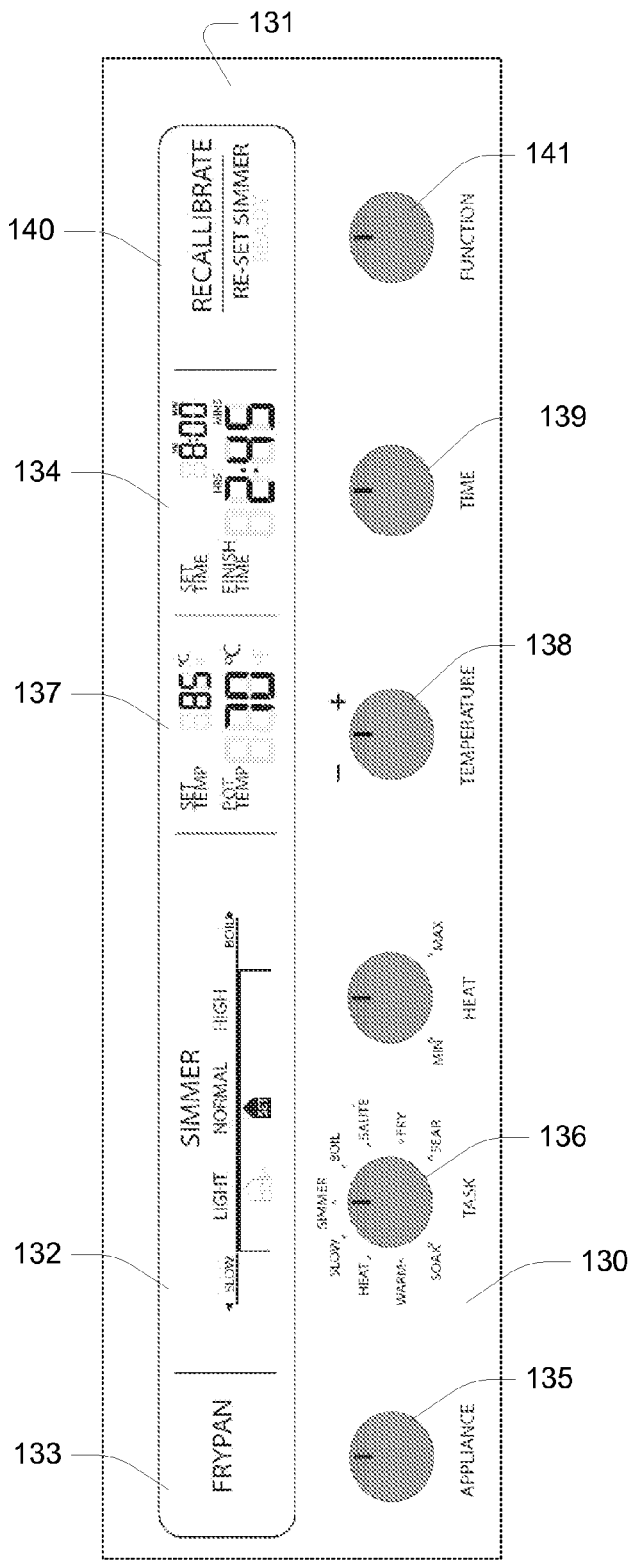
FIG. 12 is a second embodiment of a user interface panel.

A further embodiment of a user interface panel 130 is shown in FIG. 12. The panel incorporates a visual display 131 that is sub-divided into functional segments 132, 133, 134. In preferred embodiments, the appropriate user input controls (for example 135, 136, 138, 139) are provided below the appropriate display segment. For example, display segment 133 displays graphically the kind of appliance selected by the user using the rotating user input 135. Another rotating user input 136 allows the user to select between a variety of different cooking tasks such as soak, warm, heat, slow, simmer, boil, sauté, fry and sear. The users selection is displayed in the adjacent segment 132. A temperature display segment 137 displays the user selected temperature and measured temperature of a vessel in accordance with the selection made by a user on the adjacent temperature control 138. Similarly, the user selected cooking time and the actual finish time are displayed in a time segment 134 located adjacent to the user's time selector control 139. Various functions of the device are indicated in a function display segment 140 in accordance with a selection made on the rotating user input 141 located below.

Figure 13:
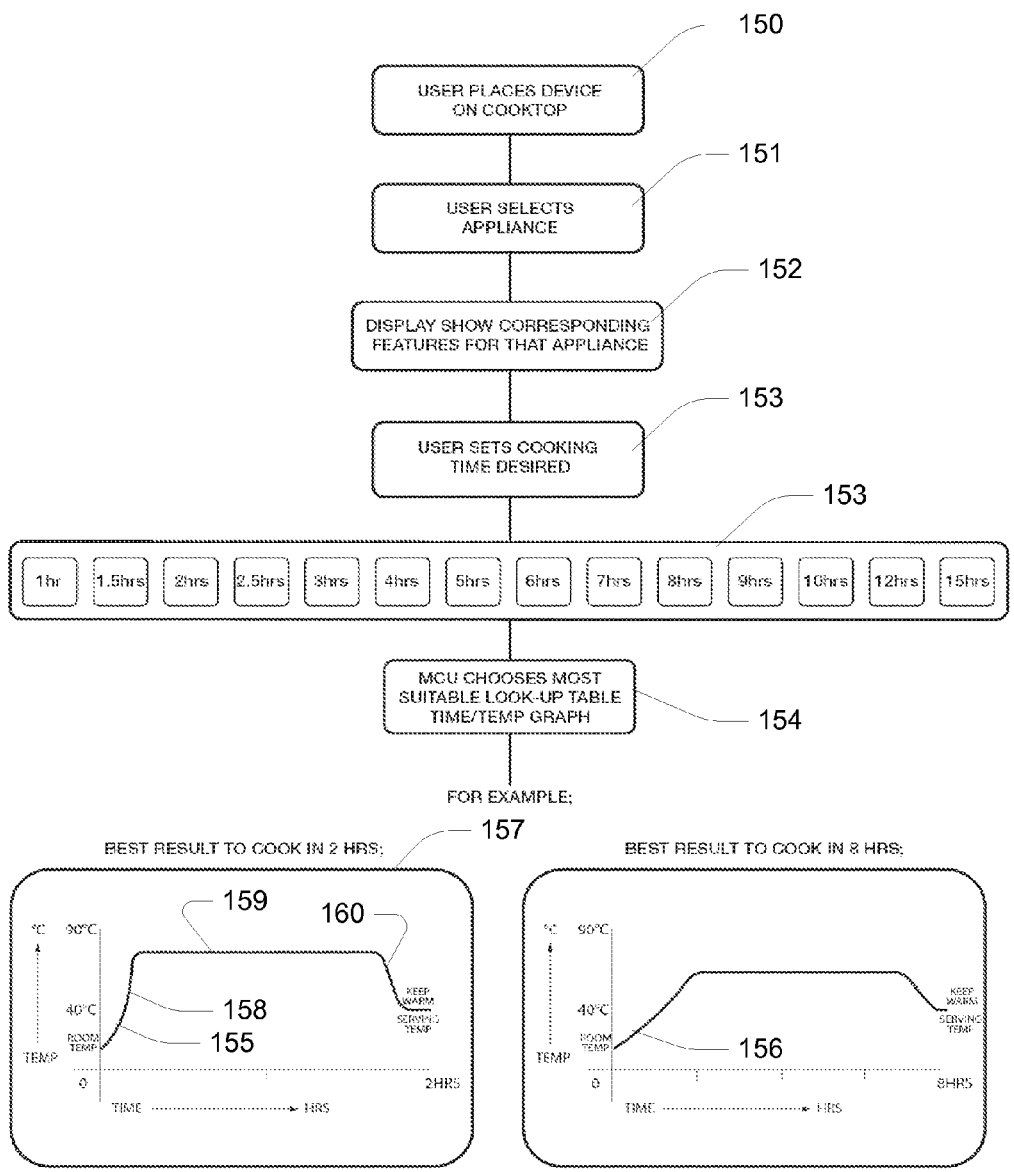
FIG. 13 is a flow chart and graphs illustrating the implementation of a cooking programme.

FIG. 13 illustrates a sequence where by various user inputs determine how a particular cooking profile is selected by the MCU. In this instance, the profile comprises the intensity of the heating process over a time interval. In this example, the process begins with the user placing a vessel 150 on the upper surface 12. The user selects an appliance, for example, by using the user input 135 discussed with reference to FIG. 12.

The selection of an appliance by the user 151 results in an appropriate display 133, and may further comprise corresponding features or display options associated with the selected appliance 152. The user then sets a desired cooking time 153. Then, the MCU, in accordance with an algorism, utilises the user selections including appliance type and total cooking time to select a cooking profile from a look-up table contained in the MCU's storage 154.

As shown in FIG. 13, when the user selects a 2 hour cooking time for a particular recipe, the temperature increase is steeper 150 than when the user selects an 8 hour cooking time, wherein the initial temperature rise 156 is less steep. The temperature profile selected by the MCU is then used by the proportional control software and cooking programme to effectuate the rise 158, maintenance 159 and decrease in temperature 160, over time.

Figure 14:
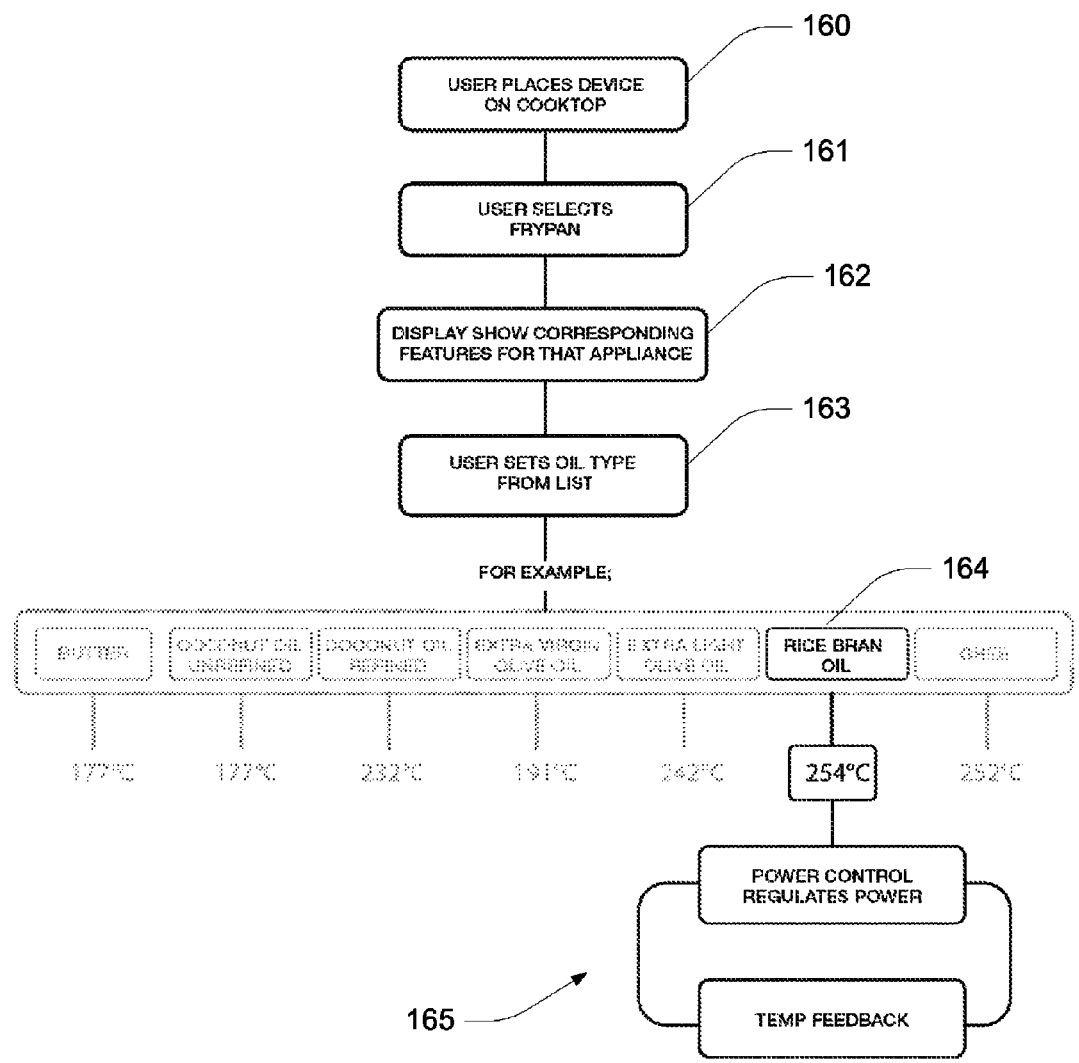
FIG. 14 is a flow chart illustrating the implementation of a second cooking programme.

The versatility of the appliance 10 is further demonstrated by FIG. 14, wherein the user places a frypan on the upper surface 12 to begin a cooking process 160. The user indicates to the appliances MCU that a frypan has been selected 161. The appropriate display is generated by the MCU for driving the display panel 17. The display shows the information and features that are appropriate for the selected appliance 162. An appropriate display for the user selection of a frypan may include a display of popular oil types from a list 163.

As suggested by FIG. 14, the displayed oil types could be, for example, butter, coconut oil unrefined, coconut oil refined, extra virgin olive oil, extra light olive oil, rice bran oil and ghee. The user is then able to select the type of oil that will be used in the cooking process 164. That selection will in turn be determinative of the way that the MCU communicates information to the power control hardware and thus to the way that power supply to the induction coil. This temperature and time regime is monitored to create a feedback loop 165 that is continuously regulated during the cooking process.

It will be appreciated that, by selecting an "Oil feature" the user can select a fat/oil type to be used and the unit limits the heat to keep below a "smoke point" of the oil. As the fat or oil reaches a respective smoke point, it breaks down to glycerol and free fatty acids. The glycerol is then further broken down to acrolein which causes the smoke to be extremely irritating to the eyes and throat. The smoke point marks the beginning of both flavour and nutritional degradation, and therefore defines a preferred maximum usable temperature. This is useful for improving health and taste of the food cooked. For example, since deep frying is a very high temperature process, it requires a fat with a high smoke point.

Figure 15A:
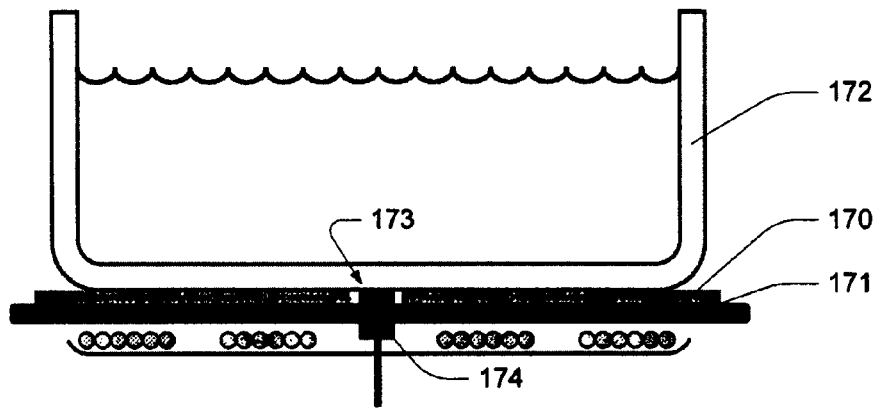
FIG. 15A is a schematic representation of an embodiment induction cooker and a cooking vessel, shown used with a silicone mat.
Figure 15B:
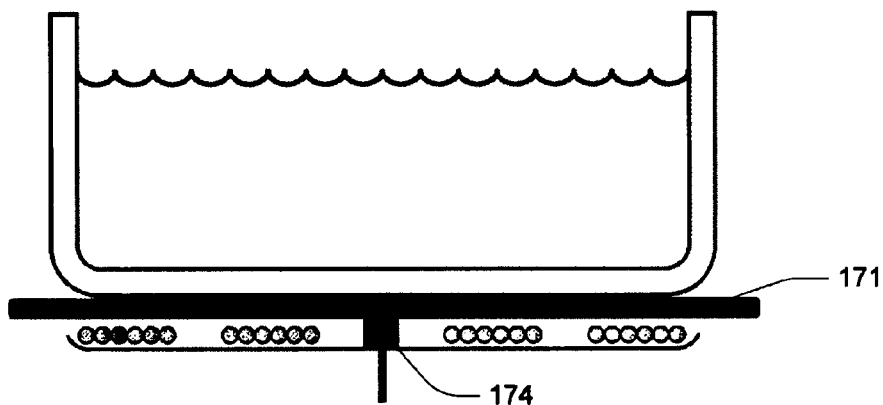
FIG. 15B is a schematic representation of an embodiment induction cooker and a conventional pot.
Figure 15C:
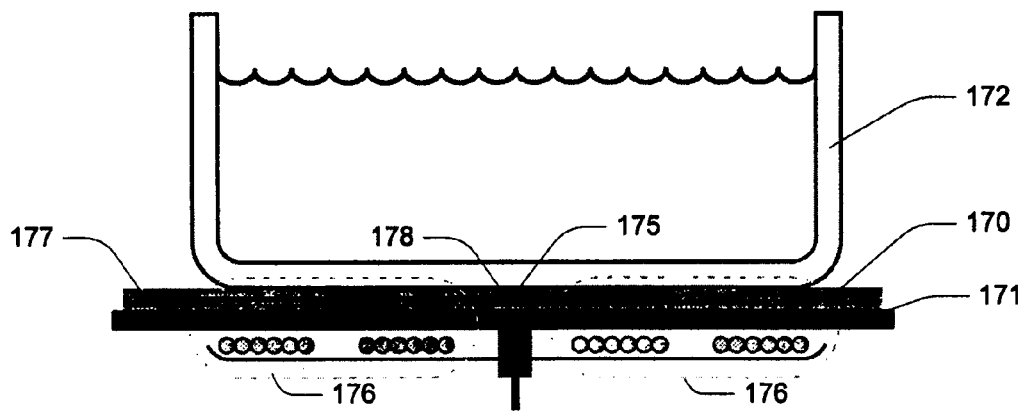
FIG. 15C is a schematic representation of an embodiment induction cooker and a cooking vessel, shown used with a silicone mat.
Figure 16:
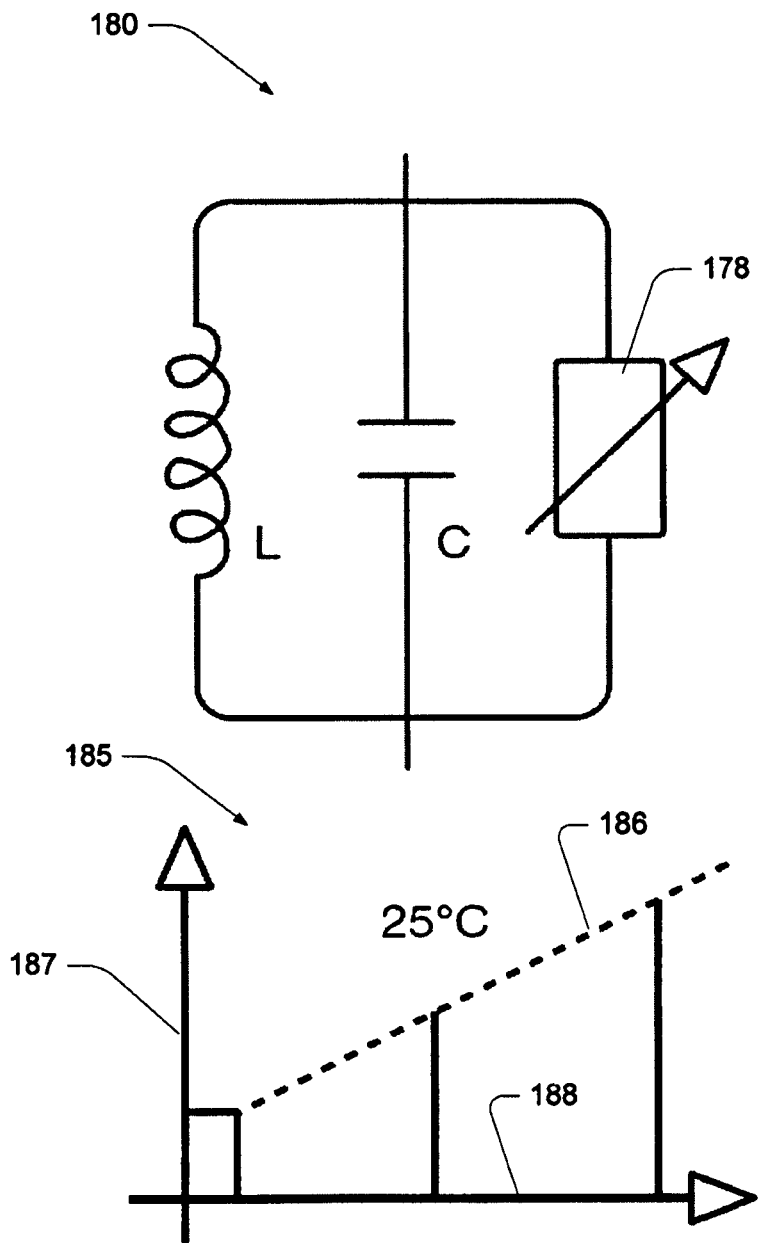
FIG. 16 is a schematic representation of an embodiment circuit that is responsive to temperature.

Referring to FIG. 15A through FIG. 15C, in an embodiment a silicon based mat 170 (similar to the silicon layer 98, 99 of FIG. 9F and FIG. 9G) could cover the entire upper cooking surface 171. In use, the silicon based mat can be sandwiched between the cooking surface 171 and the cookware 172 placed atop the surface. This silicon based mat can, by way of example only, enable any one or more of the following features:

maintaining an insulation layer, such that cooking surface can remain relatively cool, thereby keeping electronics and driving coil relatively cool;

providing an aperture 173 for allowing a 'through the cooking surface' raised thermistor 174 to still touch the cooking vessel (as best shown in FIG. 15A);

removing the mat to enable a conventional 3rd party cookware of any size to be used on the system in conventional manner, as best shown in FIG. 15B;

including a passive RFID remote temperature sensing device 175 encapsulated within the silicon mat 170, preferably centrally mounted as to minimise any effect affected by the induced 'field' 176, as best shown in FIG. 15C; the RFID remote temperature sensing device can include an RFID 'Tag' 177 and a thermistor 178, which becomes active when an active magnetic field is applied by the cooking apparatus, as best shown in FIG. 16.

Referring to FIG. 16, a tuned circuit 180, including a thermistor 178, enables the circuit to respond to temperature, according to a predetermined frequency response 185. A specific frequency response 186 defines a frequency 187 as a function of temperature 188. This can be used by the RFID tag in measuring/calculating temperature.

FIG. 17A through FIG.17E illustrate, by way of example only, alternative arrangements for thermal sensors. 1. In these example embodiments, detailed construction design for a direct pot temperature sensor include:

Design with an elastomer component;
Design with machined carbon polymer 'piston' components;
Design utilizing ceramic components.

Figure 17A:
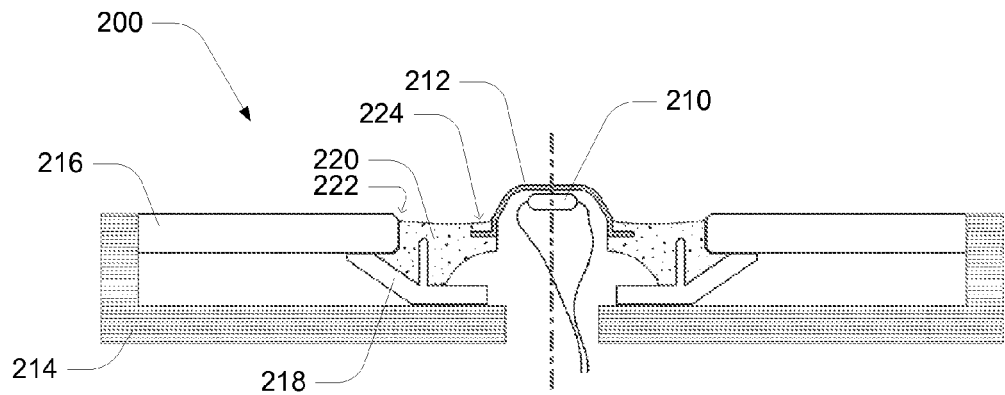
FIG. 17A-FIG. 17E show schematic views of example embodiment thermal sensors.

Referring to FIG. 17A, the temperature/thermal sensor assembly 200 can include an elastomer component. In this example, a temperature sensor 210 is located beneath and proximal to a covering element 212 (by way of example only, a dome element or an anodised aluminum dome cover or copper dome cover or non-ferrous dome cover). A fixed part 214 contains an assembly comprising an upper surface element (typically glass) 216 which is supported by a fixed support bracket 218. In this example, an elastomer component 220 couples the covering element to the fixing assembly. This elastomer component can be bonded/pressed to the glass to create a seal 222, and/or over moulded at the covering element 224.

Figure 17B:
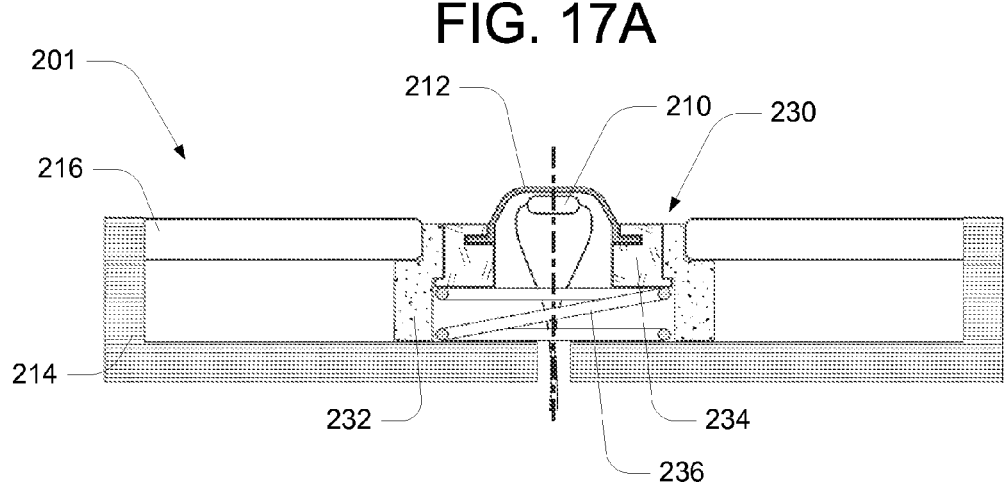

FIG. 17B shows a temperature sensor assembly 201 comprising a polymer coupling 230, which in this example include a pair of polymer 'piston' components 232, 234. The outer piston component 232 operatively supports the upper surface 216, while the inner piston component supports the covering element 212 and temperature sensor 210. The inner piston component is adapted to move in response to the application of a cooking appliance, and is upwardly biased by a bias element (typically coil spring) 236.

Figure 17C:
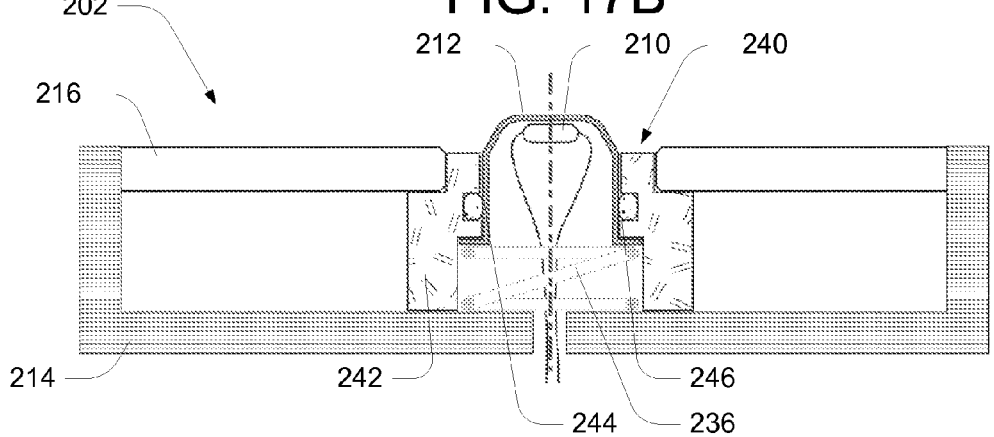

FIG. 17C shows a temperature sensor assembly 202 comprising a piston coupling 240. An inner piston component 244 may be integrally formed with the covering element 212. The outer piston element 242 can further include a sealing o-ring element 246 (typically formed of elastomer). The outer piston portion can be formed of, by way of example only, a polymer. In this example the dome element is movably retractable upon engagement with a cooking apparatus.

Figure 17D:
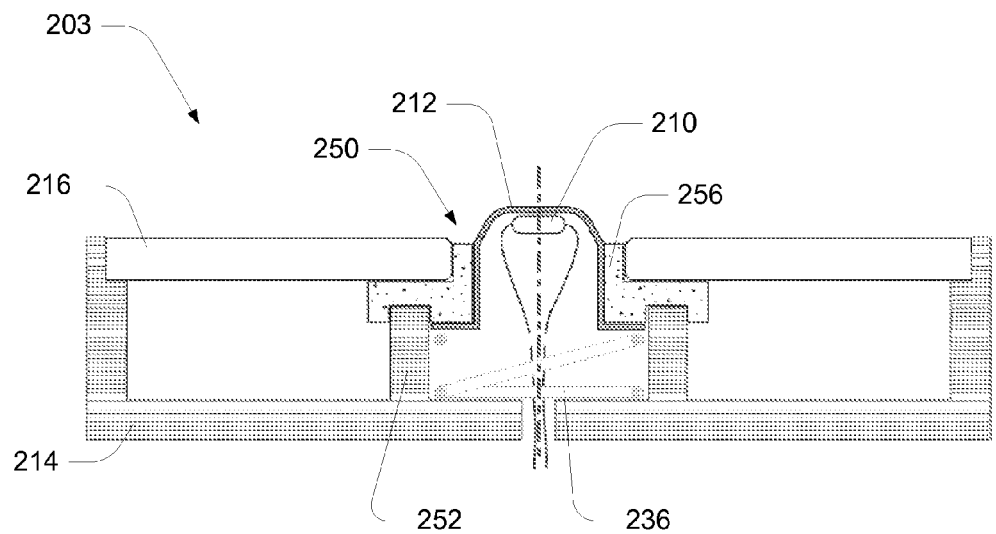

FIG. 17D shows an alternative embodiment 203, in which an elastomer element 256 supports the upper surface 216 and sealingly engages the cover element 210. The outer piston portion 252 guides the cover element to a retracted position upon engagement with a cooking appliance.

Figure 17E:
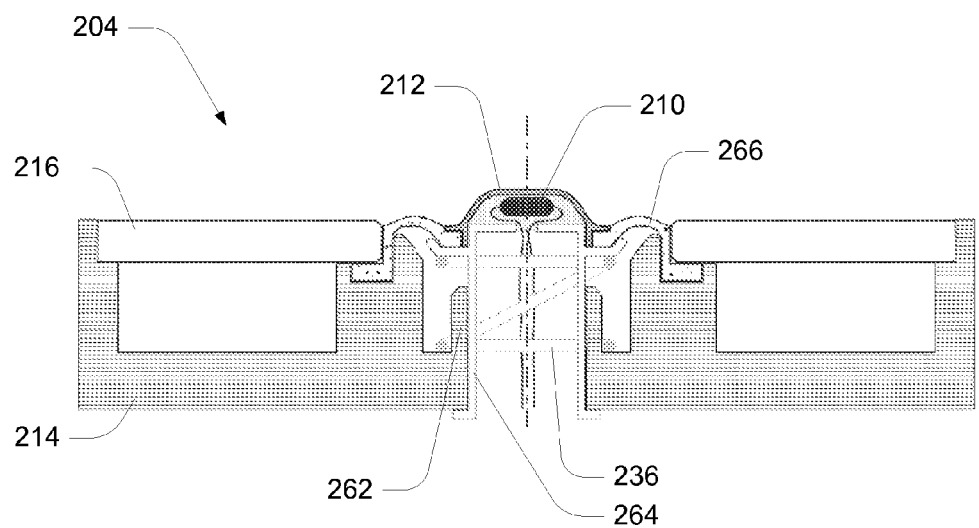

FIG. 17E shows a movable temperature assembly 204, including an elastomer membrane 266 sealably coupled to the upper surface 216 and cover element 212. An outer piston support 262 guides the centre assembly 264 (and thereby the cover element 212 and temperature sensor 210) to a retracted position upon engagement with a cooking appliance.

It will be appreciated that the cover element 212 is adapted to move in a downward position upon engagement with a cooking appliance. This element is biased into an upward engaging orientation, for example a biasing element or a resilient coupling element.

Example embodiments of an intelligent relationship within a cooking apparatus can be represented in logic process/control diagrams. This intelligent relationship can be enabled through recognizing cookware properties. Before release of cookware, respective properties will be defined in the software. A cooking unit can have facility to update the software/firmware to enable forward compatibility for newly released cookware.

Advantages of the intelligent relationship within a cooking apparatus can include any one or more of the following:

Additional User Interface functions;
UI logic control to guide a user in interfacing with functionality;
A plurality of methods for a user to interface with the apparatus;
A "Cooking" Menu for automation control;
A "Task" Menu using slider bar that can assist a user control result in cooking;
Direct switch on with temp regulation bypassing automation, but user alerted to automation possible;
Direct switch on and no temp regulation (same as typical existing cook tops);
A "Learning Mode", wherein the apparatus can learn properties of 3rd Party cookware (AllClad, LeCreuset etc)—for example, Boil 1 ltr of water and record temp slope;
Altitude setting of unit to determine boiling point of water;
A customisable indexing of encoder dials—for example, to suit task or personal preference.

Appliance control can include any one or more of the following steps:

storing thermal properties of a plurality of cookware;
selecting the 'cookware' in use;
enabling access to easy to use functions;
selecting Cooking Task Presets to assist cooking (these can be customised and saved for later recall); and
adding/downloading new features.

FIG. 18A through FIG. 18I, disclose an example apparatus control interface.

Figure 18A:
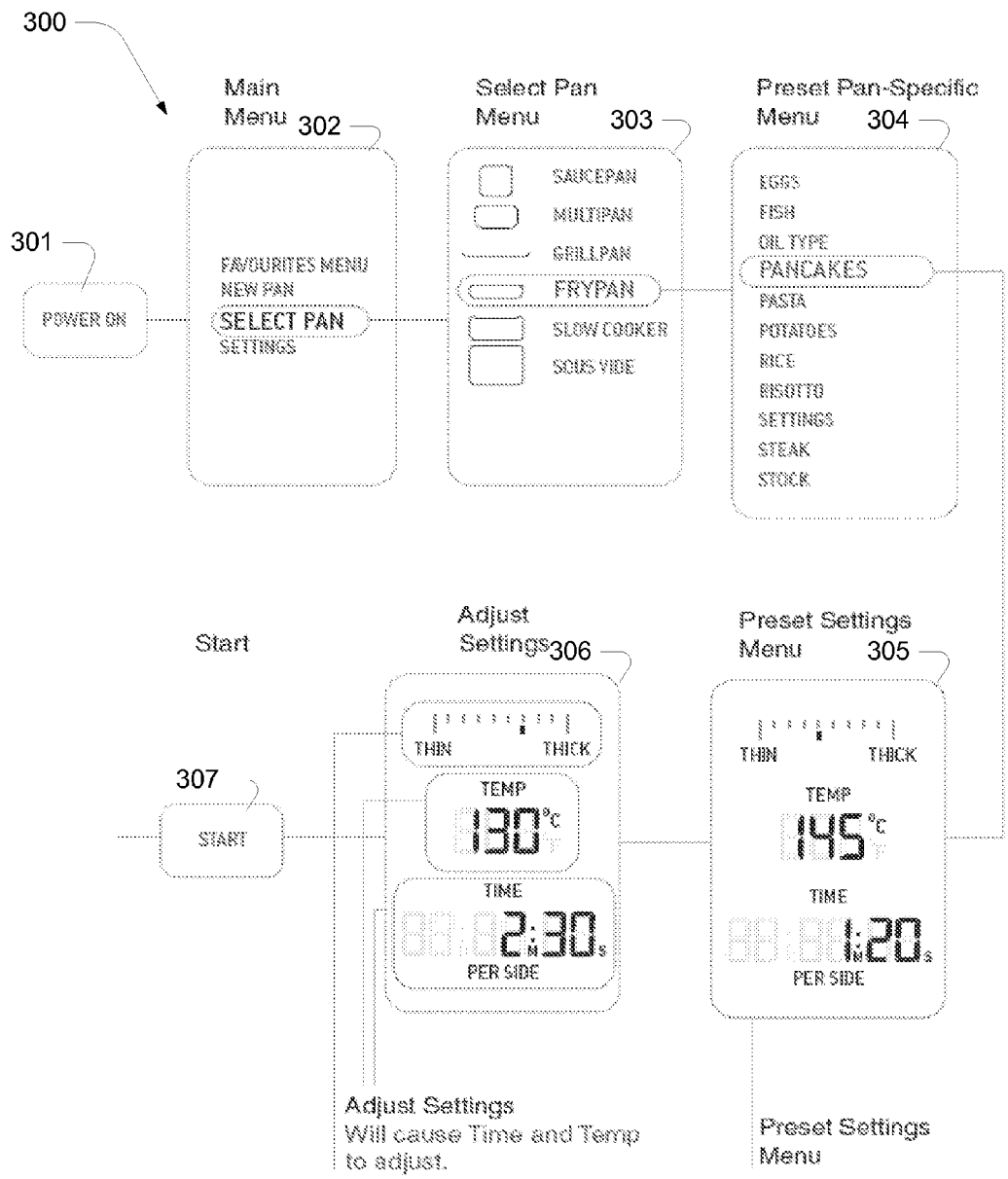
FIG. 18A-FIG. 18I show schematic views of embodiment control interface methods.

Referring to FIG. 18A, in this example, upon power-on 301 the main menu enables selection of 302: "favourite menu", "new pan", "select pan" and "settings". By selecting "select pan", a select pan menu 303 provides a list of available known/selectable cookware. Upon selection of a specific cookware in the menu, a preset cookware specific menu 304 can be displayed. With a menu selected, a preset settings menu 305 can be displayed, showing the default preset settings. These preset settings can be adjusted in the adjust settings menu 306. Once settings are configured the user can select start 307.

In the example shown in FIG. 18A, a user has selected a frypan for cooking pancakes having a pre-set default setting of a medium thickness to be cooked for 1 minute, 20 seconds per side at a temperature of 140 deg Celsius, to which the user has adjusted the default settings to a thicker pancake cooked at a temperature of 130 deg Celsius requiring cooking time of 2 minutes 30 seconds per side.

Figure 18B:
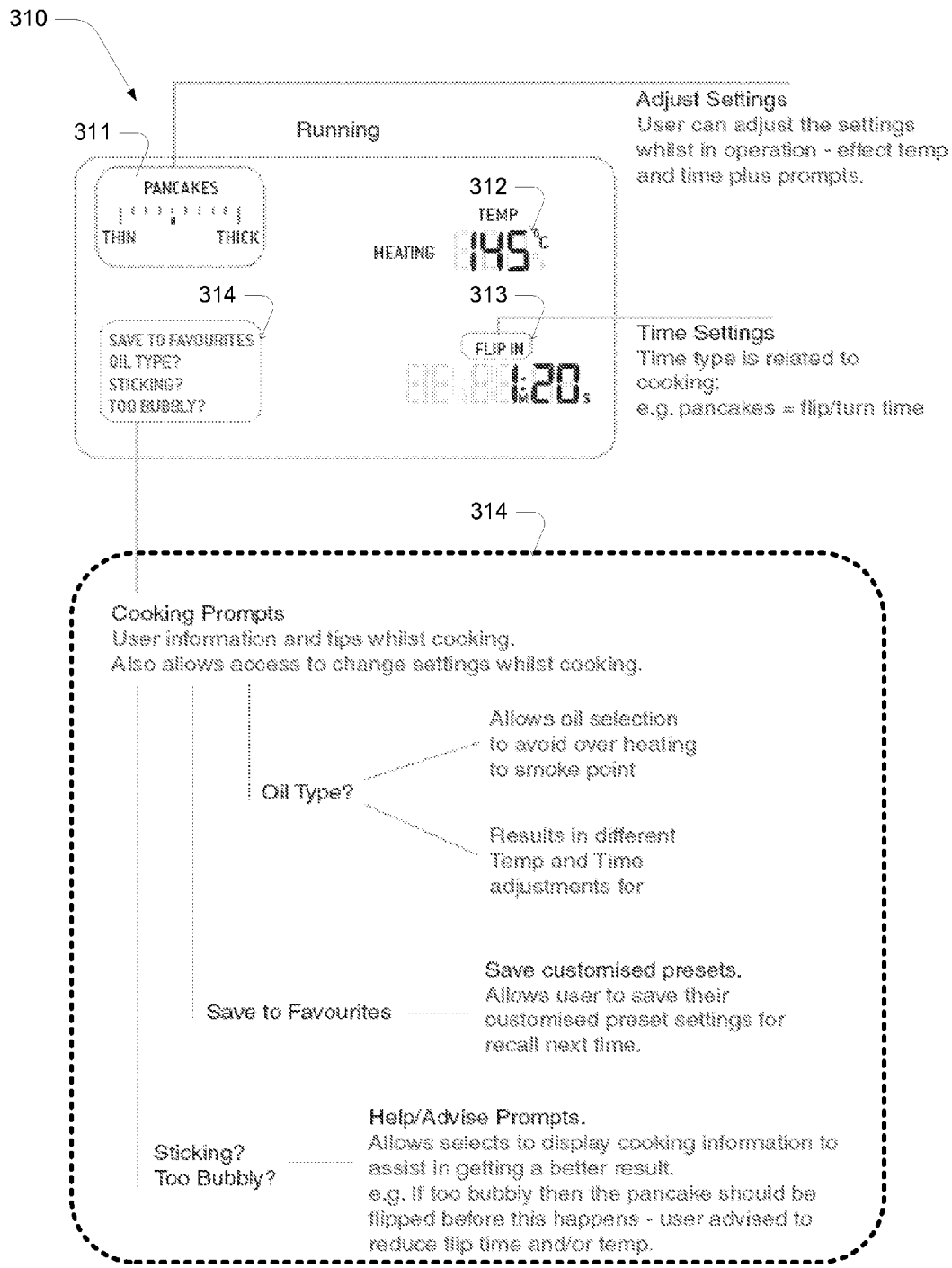

Referring to FIG. 18B, the appliance control mode 310 can allow a user to use preset functions. In an example of cooking pancakes, the user can adjust the settings 311 whilst in operation, for example effecting temperature 312 and cooking time 313. The apparatus can further provide prompts 314 to the user in respect of a user adjusted cooking setting.

In this example, prompts 314 to the user can include any one or more of the following: "saved to favourites", "oil type?", "sticking?", and "to bubbly?". Upon user selection of particular cooking prompts the oil type can suggest oil selection for avoiding overheating and can result in different temperature and time adjustments. For sticking? and to bubbly? advice/help the apparatus can provide advice for providing a better result. Save to favourites enables a user to save their custom preset settings for later recall.

Figure 18C:
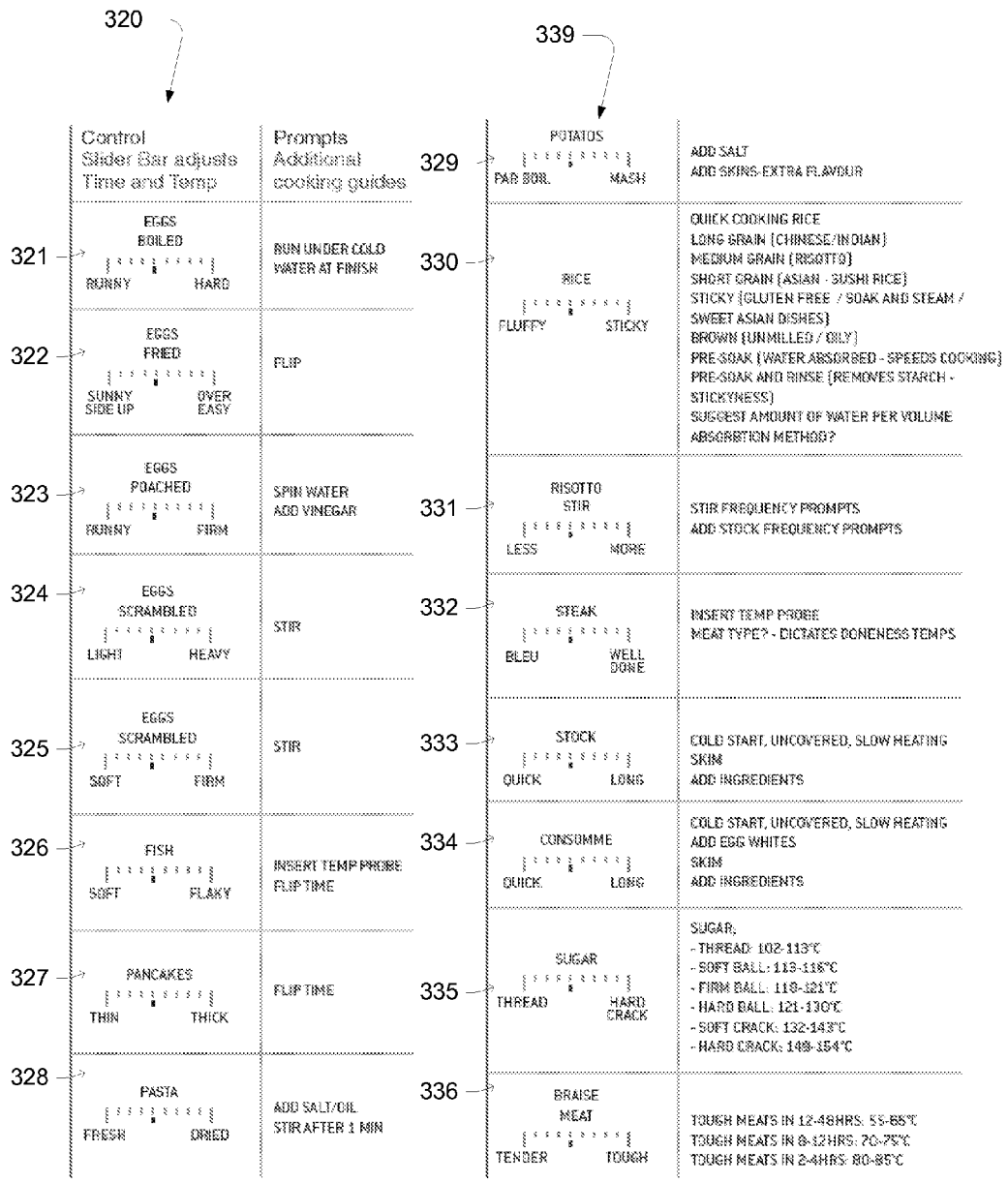

FIG. 18C, shows the appliance control user interface including a slide bar adjustment in regards each of a plurality of cooking modes. For example, a slide bar adjustment 320 can change the recommended cooking temperature and/or cooking time and/or other presets. Associated prompts 329 can also be provided in relation to selected settings.

It will be appreciated that while FIG. 18C shows control slide bar adjustments for: "boiled eggs" 321, "fried eggs" 322, "poached eggs" 323, "scrambled eggs" 324,325, "fish" 326, "pancakes" 327, "pasta" 328, "potatoes" 329, "rice" 330, "risotto" 331, "steak" 332, "stock" 333, "consume" 334, "sugar" 335, "braised meat" 335—with associated prompts for additional cooking guides—the apparatus is not limited to these particular control interfaces.

Figure 18D:
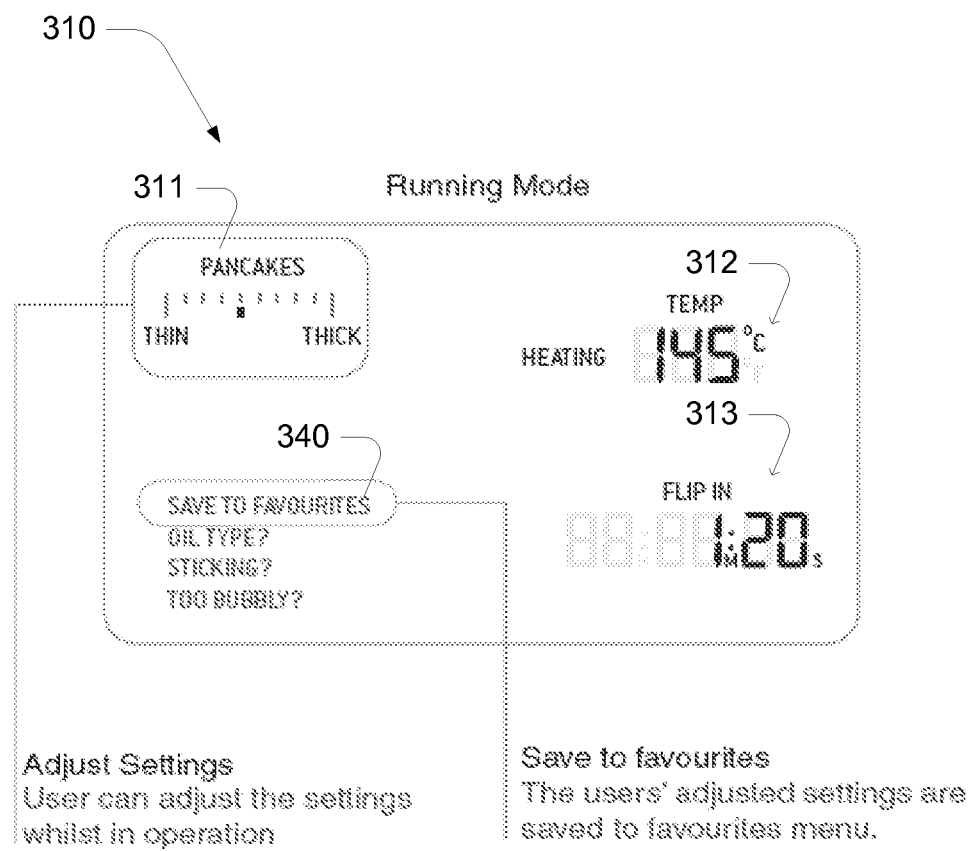

Referring to FIG. 18D, as previously disclosed, a user may select to save the current adjusted settings as a preset favourites. For example, the use may select (save to favourites) from the prompt menu 340.

Figure 18E:
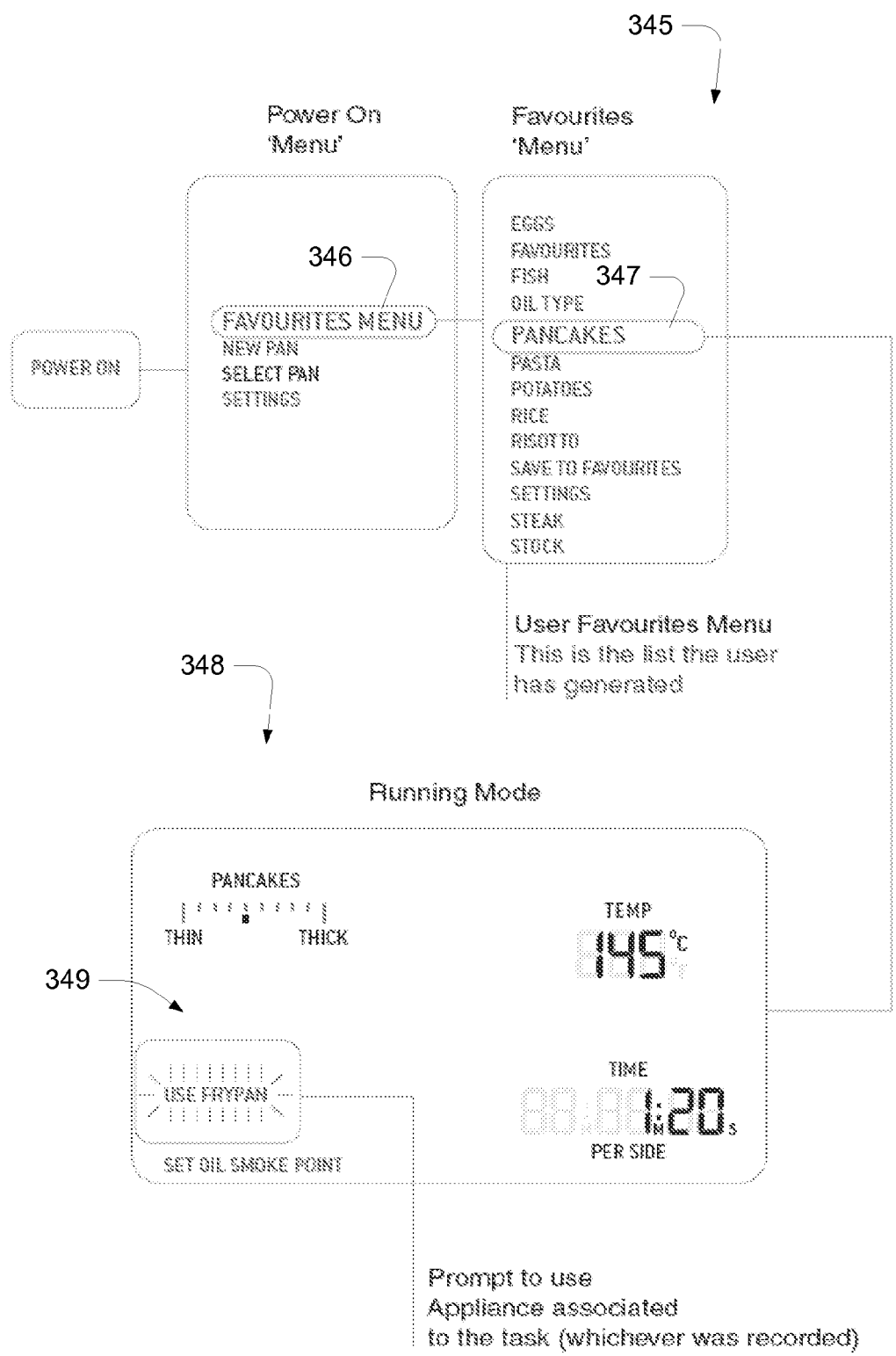

Referring to FIG. 18E, upon saving adjusted settings to a favourites menu, the appliance can maintain a "favourites menu" 345 for selection by the user. For example, upon selected use of the favourites menu, user can select 346 one of the previously saved adjusted settings from the favourite menu. Upon selection of a particular favourites menu 347 (for example, pancakes), the user interface can display 348 the saved adjusted settings for the menu, and can provide prompts 349 in relation to the particular cookware selected in cookware or ingredients (such as oil) that were previously saved—thereby alerting the user to requirements in relation to this particular menu. It will be appreciated that this allows a user to move directly to a customized and saved menu.

The appliance control interface can further allow a user to configure new cookware for use with the user interface menu 350. The cookware can be saved under a user defined name. Newly configured cookware can be recalled with the "select pan" menu.

Figure 18F:
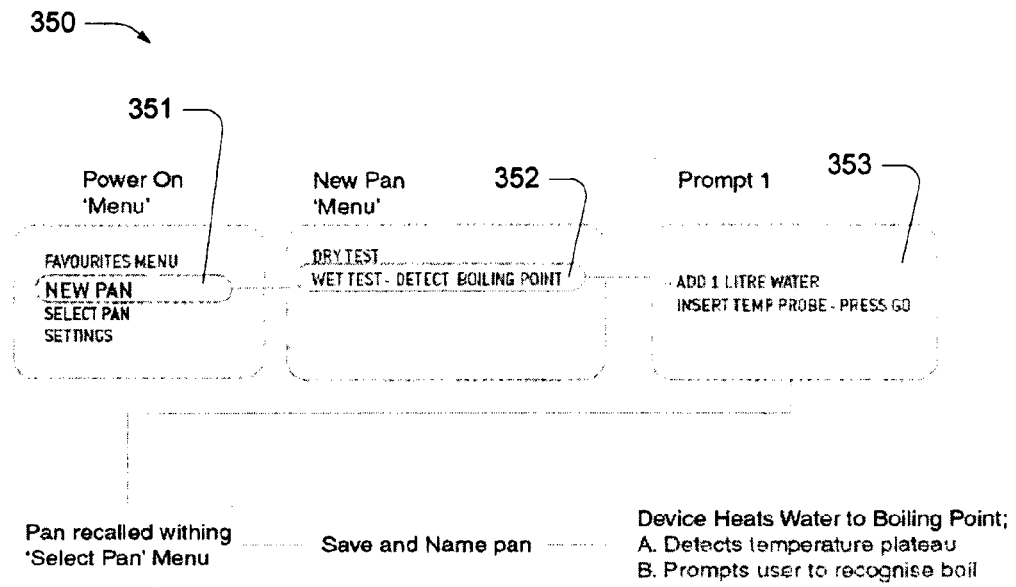

FIG. 18F shows that a new pan selection 351 can enable a user to has selected a wet test 352 by detecting a boiling point. The user is prompted to add one liter of water and insert a temperature probe and select 'go' 353.

Figure 18G:
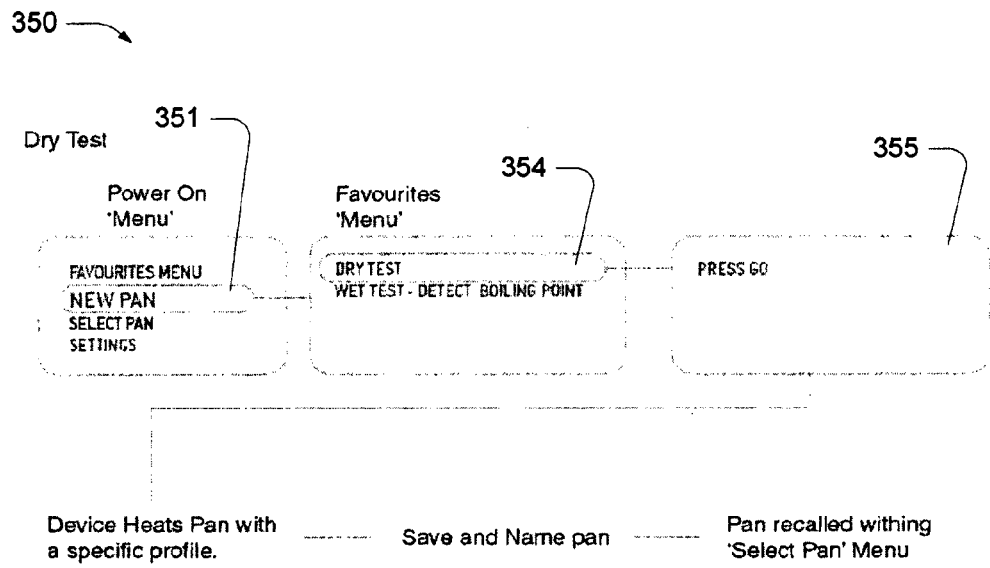

FIG. 18G shows that shows that a new pan selection 351 can enable a user to has selected a dry test 354. The user is prompted to select 'go' 355. A dry test selection can include the apparatus heating a cookware with a specific profile.

Figure 18H:
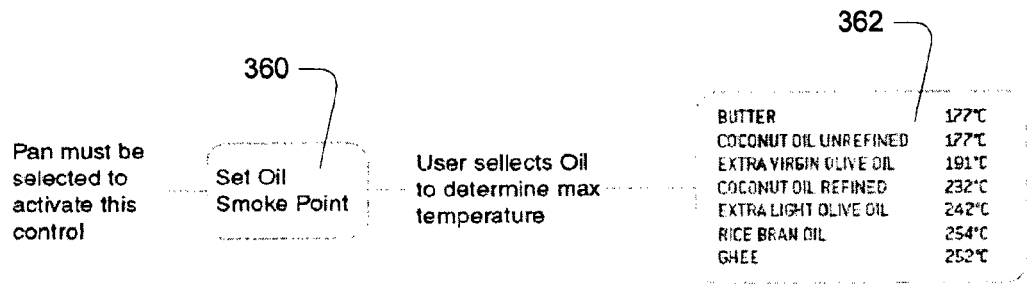
Figure 18I:
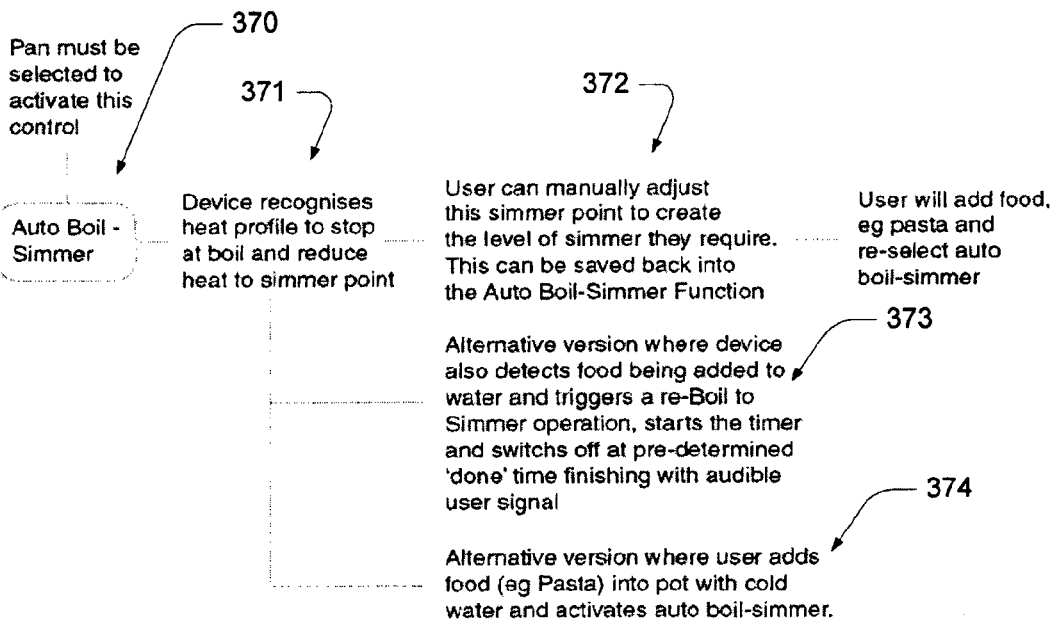

The appliance control menu can also be used to access special automated functions. For example, FIG. 18H shows user settings for set oil smoke point 360, which can determine the maximum cooking temperature for a selected oil type 362. For example, FIG. 18I shows an autoboil-simmer function 370, where the apparatus can recognise a heat profile to stop at the commencement of boiling and to reduce the heat to a simmer point 371. The simmer point can be manually adjusted 372. The apparatus may detect when food is being added to the fluid and commence a re-boil to simmer operation 373. Similarly, the apparatus can detect the addition of food (for example, pasta) into cold fluid and automatically activate a boil/simmer function 364.

The user interface can also enable heat/temperature control. Typically, a user can access any of these modes in the user interface, and temperature regulation can also be used. A user can determine the heat-up rate or time for gentle heating of delicate foods.

Figure 19A:
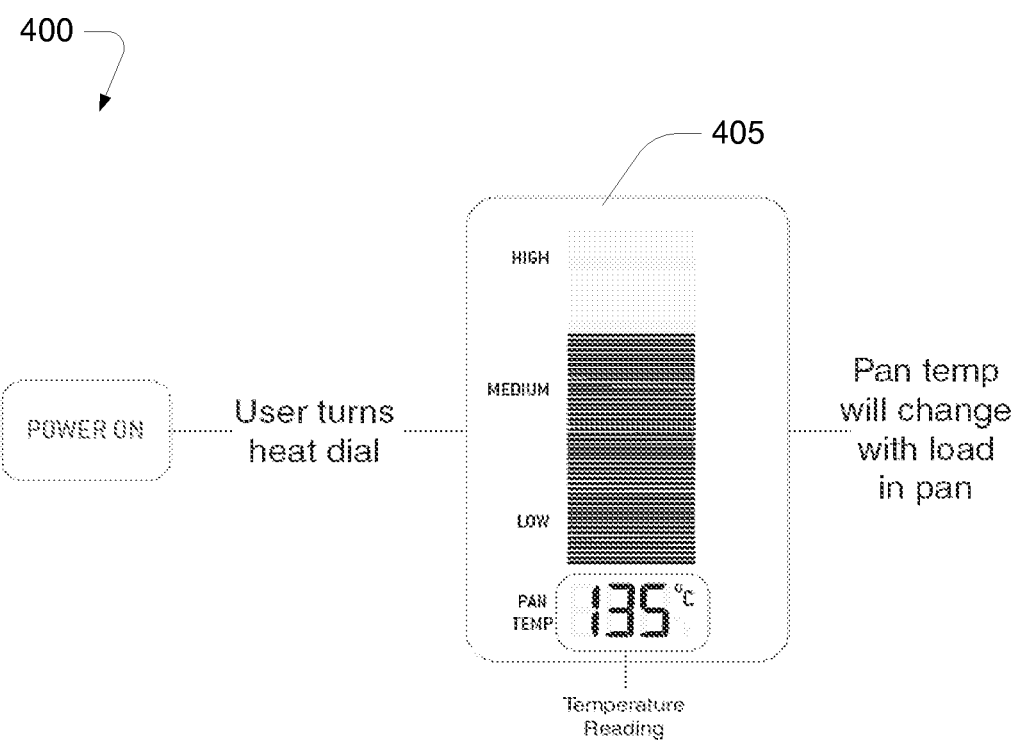
FIG. 19A-FIG. 19D show schematic views of embodiment control interface methods for input control.

FIG. 19A shows a heat input control mode interface 400, wherein the apparatus functions as a typical cooktop. In this example, the user selects a temperature 405 (for example, turning a temperature setting dial) and only electrical power is applied to the heating coils. In this embodiment, temperature sensing can be used, but not necessarily fed back to user to protection against over heating of a cookware element (e.g. a pan) and/or sensor and/or internal components, by maintaining temperature below a preset upper temperature limit.

Figure 19B:
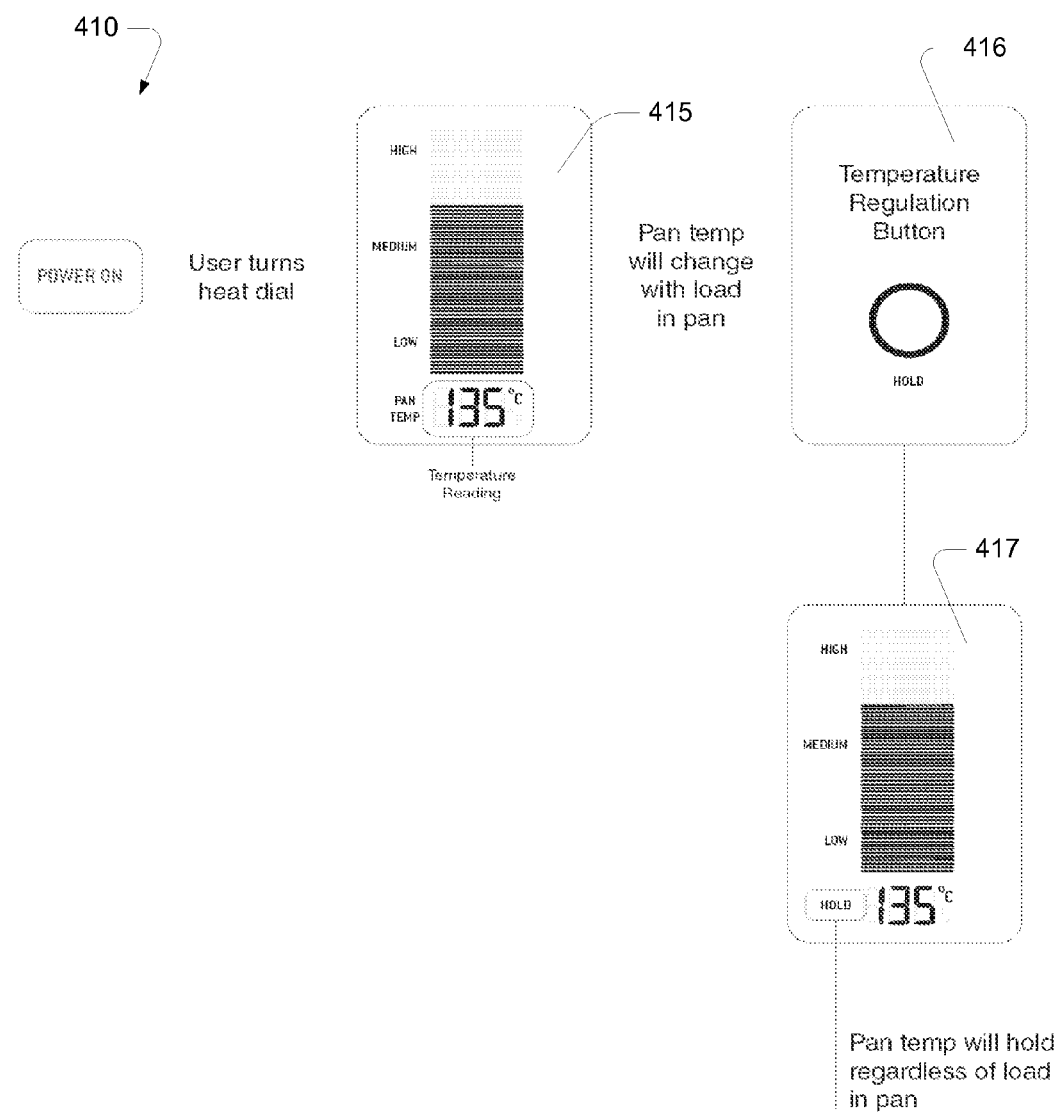

FIG. 19B shows a heat input control mode interface 410, wherein the apparatus functions as a typically cooktop when only power is applied. This mode allows a user to regulate temperature by selecting a temperature 415. The cookware temperature can change with load, and a user can select a temperature regulation button 416 to hold a particular regardless of load in the pan 417.

Figure 19C:
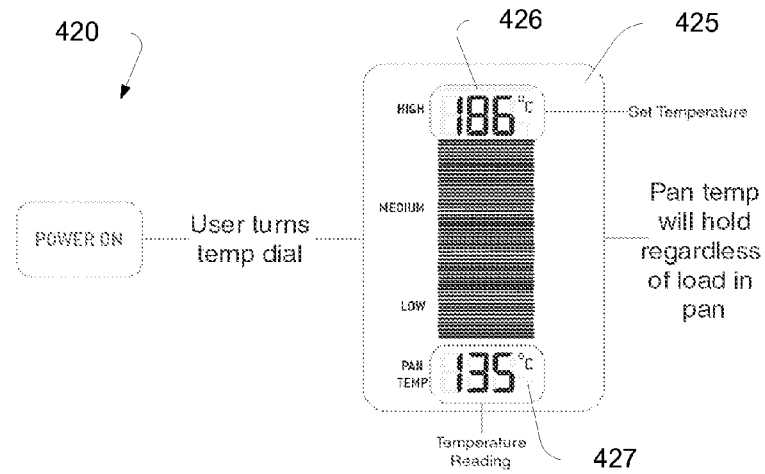

FIG. 19C shows a temperature input control mode interface 420, enabling full regulation of temperature 425. The user interface displays the set temperature 426 and the current cookware temperature reading 427.

Figure 19D:
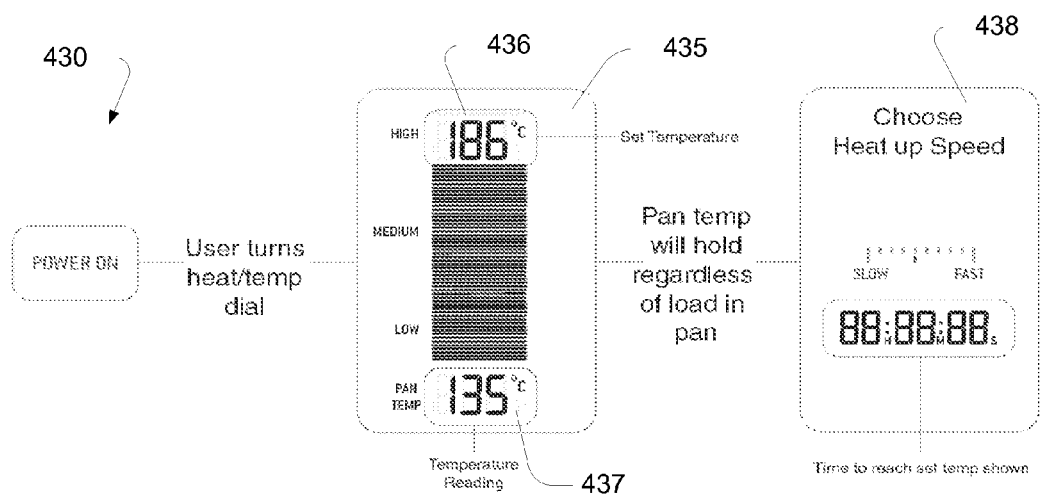

FIG. 19D shows a temperature and heat speed control mode interface 430, which enables full regulation of temperature 235 with user control of the temperature rate. The user interface displays the set temperature 236 and cookware temperature 237. The interface enables a user to select a time period for reaching the set temperature 238. It will also be appreciated that this operation can also be automated when selecting a cooking process that involves a specified heat speed (for example, a Consume).

The user interface can further enable task control.

Figure 20:
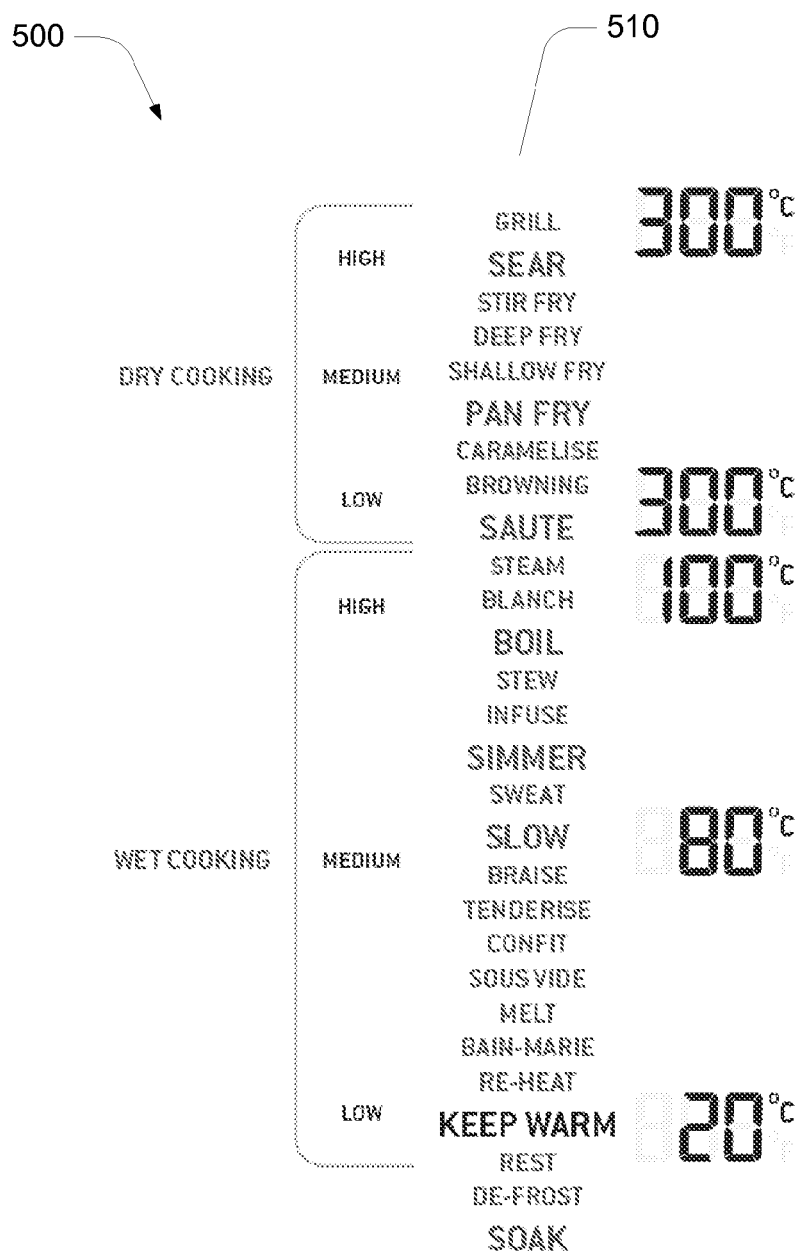
FIG. 20 shows a list of cooking tasks structured in respect of a range of temperature.

FIG. 20 shows a list of cooking tasks 500 structured in respect of a range of temperature, for guiding a user to select an appropriate temperature for a specific task 510.

The user interface can further enable time control for cooking. The apparatus can include many selectable options for a user. Time control options can enable this user selection of any one or more of the following: timer (for example, count-up and/or count-down), finish time (for example, calendar time and/or elapse time), delay start (for example, set start time and end time), stir reminder, turn reminder, at finish, set clock and reset time.

FIG. 21A shows, by way of example only, user interface settings 600 for time control.

FIG. 21B shows a user initiated sequence 610 for using a pause/return function. Using a pause/return selection, the apparatus can reduce the cooking temperature to a "keep warm" mode. Food safety standards can be incorporated in to this mode by limiting the temperature and/or time that pause function can be enable.

Further aspects of the user interface can enable:
  a user can create a personal cooking profile by recording a cooking sequence for later recall—whereby the user can utilise a plurality of cooking functions within the user interface and save the process for later recall.
  enable custom settings for the apparatus, including: setting altitude, setting colours, sound selection and encoder calibration—whereby setting altitude, the boiling point of water can be established, colours can be selected for communicating cooking cycles or states, sounds (for example beep, tone or music) can be selected for particular operations or cooking states, prompts and alerts, and encoder calibrations can be set to alter the step selection and sensitivity of the apparatus control dials.

It will be further appreciated that the software and datasets available to the apparatus can be updated or maintained. This can include features for any one or more of the following: debugging, improving or adding cooking functions, adding cookware, and/or updating software/firmware.

The user interface can provide an External Temperature Probe Prompt. For example, when selecting a foods or cooking process that would benefit from using the remote probe—such as meat temp, achieving accurate+/1 deg C.). The apparatus can then use this additional temperature data to include into the heat input calculation. One or more probes can be connected at a time.

Figure 22A:
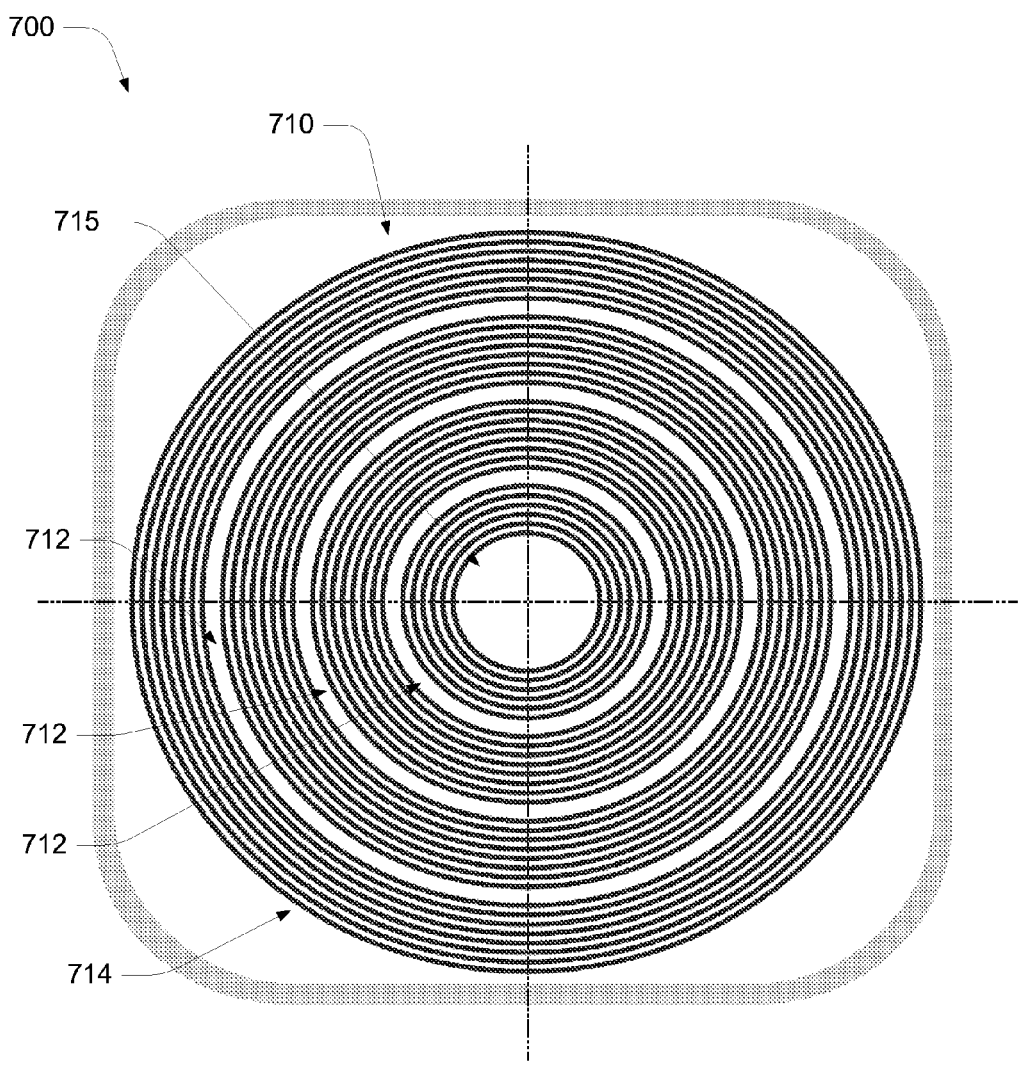
FIG. 22A-FIG. 22C show schematic views of embodiment induction coils assemblies.
Figure 22B:
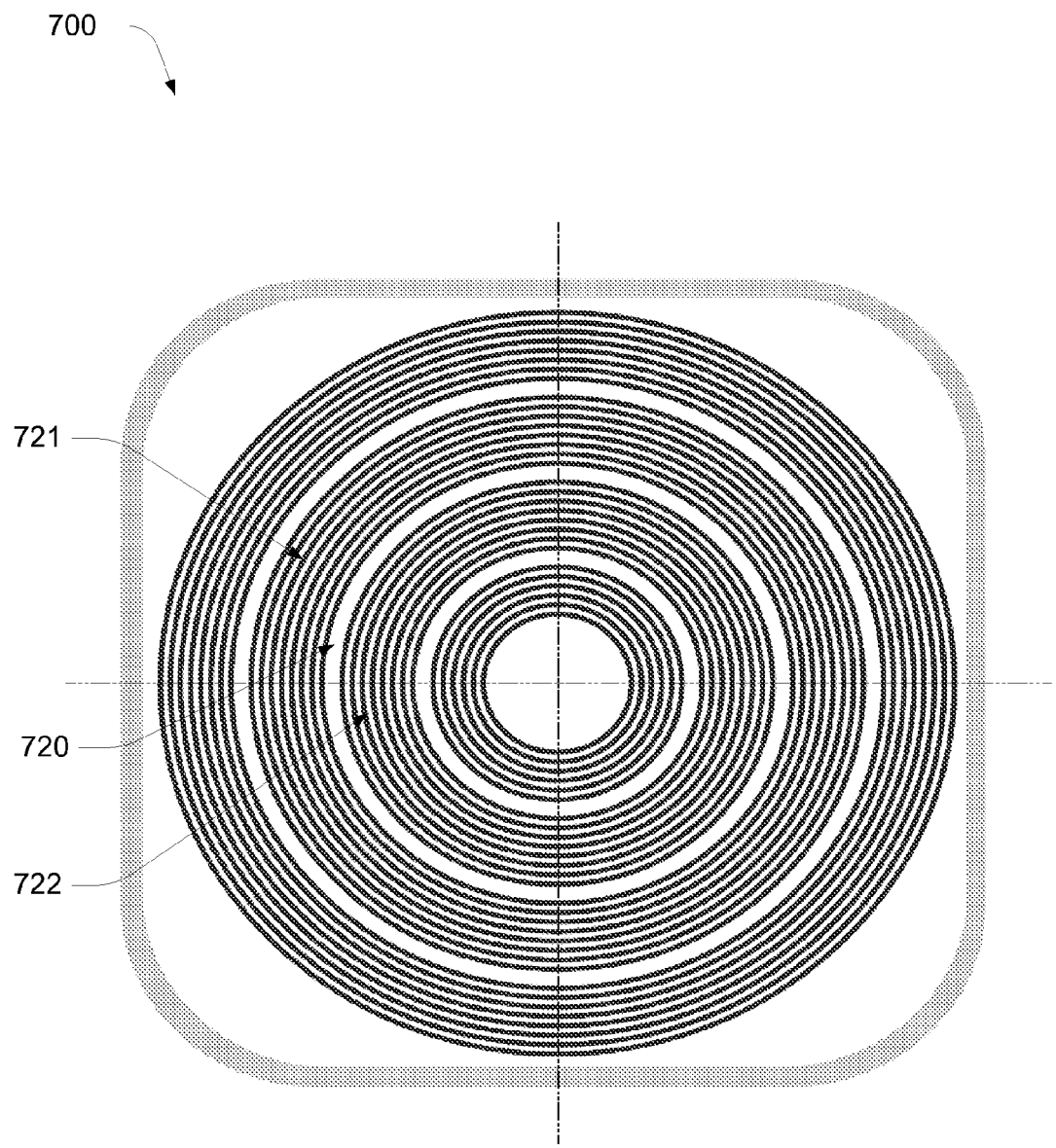
Figure 22C:
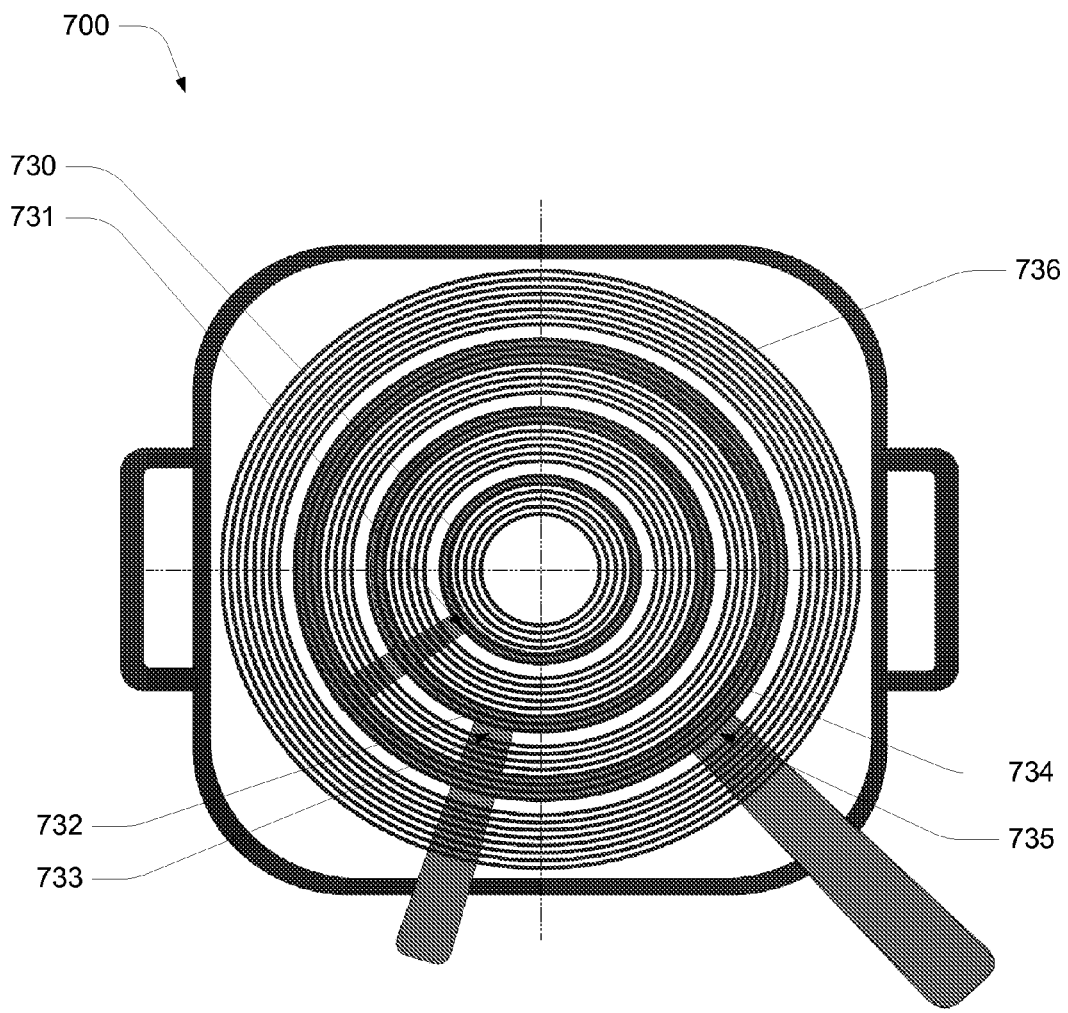

FIG. 22A through FIG. 22C show example embodiments of induction coils 700 using, by way of example only, Litz Wire Coil Construction. These coil constructions can increase efficiency of heating evenness; and/or increase efficiency of cooling.

FIG. 22A shows, a multiple gap coil 710 within a single continuous coil type, i.e. a single driving coil). This coil construction includes a of gap regions 712 (or variations thereof) for assisting in reaching a larger outside diameter (OD) 714 for large cookware whilst retaining a small inside diameter (ID) 715 for smaller cookware. This coil construction further enable a substantially even 'power' distribute across the cooking the surface.

In this embodiment, by way of example only, a first plurality of substantially evenly distributed turns of the coil are separates from a second plurality of substantially evenly distributed turns of the coil by a substantially larger gap region. It will be appreciated that, while the coil comprises a single continuous coil type, plurality of coil turns can define a plurality of spaced band of substantially regularly spaced coil turns.

Referring to FIG. 22B, the gap regions defined between adjacent bands of coil turns (for example gap region 720 defined between adjacent bands of coil turns 721, 722), can improve air flow through the coil—by providing an arrangement of one or more larger inter coil gap regions. By way of example, a coil with multiple gap regions can allow air flow from forced air system to flow through and around the coil.

Referring to FIG. 22C, the gap regions defined between adjacent bands of coil turns can confirm with sizes of standard or supported cooking vessels. Coil with multiple gaps which match the predetermined size of different pieces of cookware to better optimise cooking/heating performance. By way of example only, the coil may include any one or more of the following:

a first inner band edge 730 adapted to suit the size of small size cookware 731;
a second inner band edge 732 adapted to suit the size of medium size cookware 733;
a third inner band edge 734 adapted to suit the size of large cookware 735;
a fourth outer band edge 736 adapted to suit the size of large square cookware, such that the square cookware sits over largest 'ring' 736.

Figure 23A:
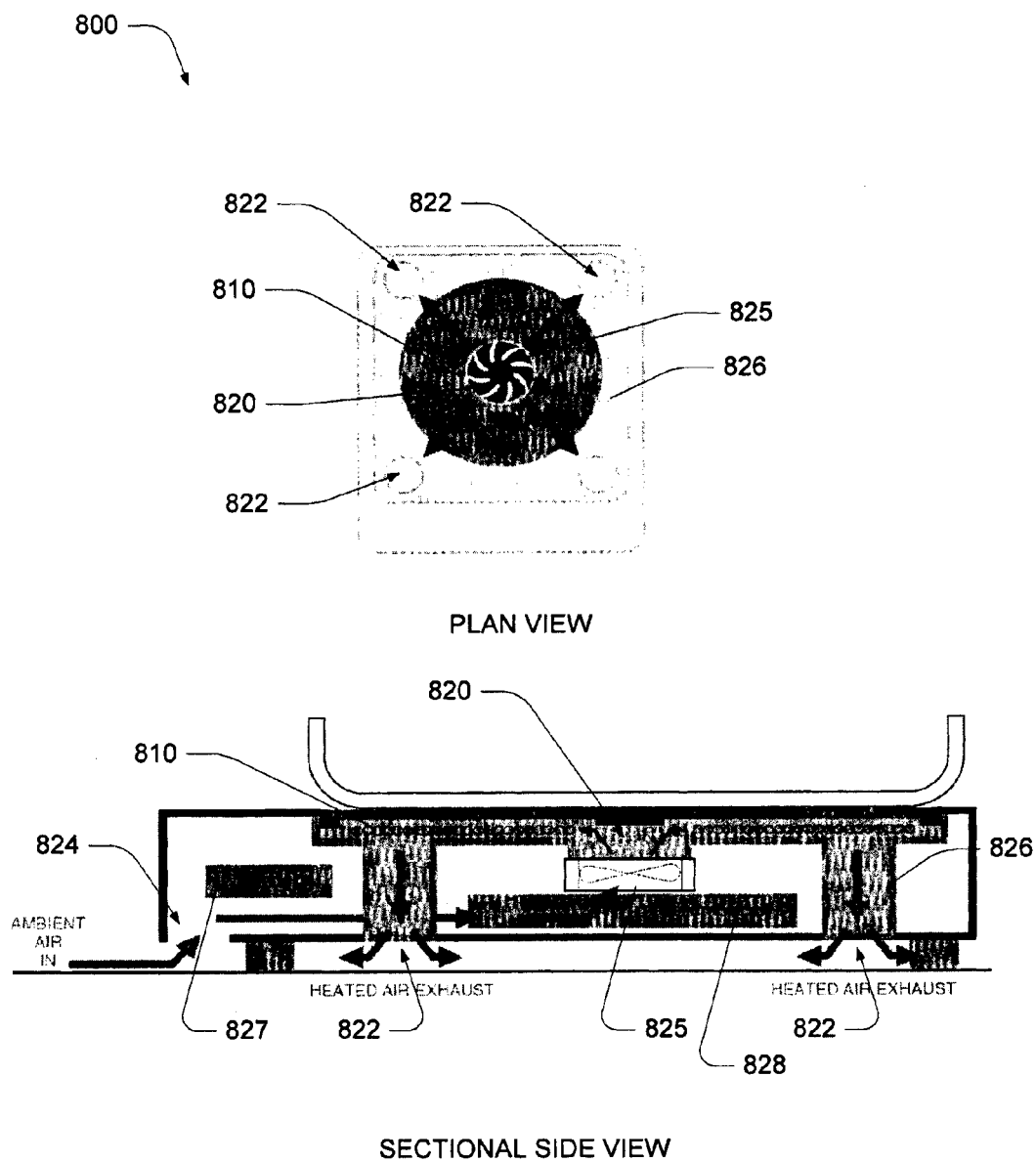

An embodiment apparatus can include an induction coil cooling system. FIG. 23A through FIG. 23C show a coil constructed in a housing sealed to the underside of the cooking surface, with air forced into and guided out. This enables a coil to remain at lower temperatures and facilitates maintaining high heat in cookware (and protection for reliability in electronics). Using coil temperature feedback, a fan speed can be controlled (such as switch on or off, and/or speed controlled) to provide quieter operation at lower temperatures (e.g. during long slow cooking times). The fan can also operate to selectively cool a temperature sensor, for example when switching pots/or appliances.

Referring to FIG. 23A, a cooling system 800 for a coil 810 can include:

an relatively centrally located air ingress aperture 820, for example located proximal (or under) a central temperature sensor; and an a plurality of air egress apertures 822, preferably for creating relatively even coil cooling, for example located about the periphery of the coil.

In this embodiment, air 824 at a substantially ambient temperature is drawn (typically by a fan assembly 825) into the cooling system and though the ingress aperture 820, which then flows to the egress apertures 822. Airflow is typically directed by a housing element 826. It will be appreciated that, by drawing ambient temperature air over the electronic elements 827, 828, affective cooling of the electronic elements can also be maintained.

Referring to FIG. 23B, a cooling system 801 for a coil 810 can include:

an air ingress aperture 830 located proximal to a side of the coil; and
one or more air egress apertures 832, preferably for creating relatively even coil cooling, for example located about the periphery of the coil.

In this embodiment, air 834 at a substantially ambient temperature is drawn (typically by a fan assembly 835) into the cooling system and though the ingress aperture 830, which then flows to the egress apertures 832. Airflow is typically directed by a housing element 836. Using an air inlet at front of the apparatus, forcing air from front to a rear outlet can reduce mixing hot and cold air—pushing hot air away from the bench top and user.

It will be appreciated that, using a second fan 839 to draw ambient temperature air over the electronic elements 837, 838, affective cooling of the electronic elements can also be maintained.

Referring to FIG. 23C, a cooling system 802 for a coil 810 can include:

an air ingress aperture 840 located proximal to a side of the coil; and
one or more air egress apertures 842, preferably for creating relatively even coil cooling, for example located about the periphery of the coil.

In this embodiment, air 844 at a substantially ambient temperature is drawn (typically by a fan assembly 845) into the cooling system and though the ingress aperture 84o, which then flows to the egress apertures 842. Airflow is typically directed by a housing element 846.

It will be appreciated that, in this example embodiment, a venturi aperture 842 utilise the exhaust air from the egress aperture to draw ambient temperature air over the electronic elements 847,848, to provide a second air flow path and enable effective cooling of the electronic elements can also be maintained.

While the present invention has been disclosed with reference to particular details of construction, these should be understood as having been provided by way of example and not as limitations to the scope or spirit of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. A cooking appliance for heating an item used in food preparation or food serving or cooking, the appliance including:
   a chassis having an upper platform for supporting the item in use;
   an induction element located below the platform for heating the item in use;
   a temperature sensing assembly having a temperature sensing element; the temperature sensing element providing a temperature signal indicative of a current temperature of the item;
   a cooling assembly within the chassis for providing airflow about the induction element; wherein the cooling assembly includes a housing that defines a first cooling region about the induction element and a first fan for providing the airflow about the induction element; wherein the housing defines a substantially separate second cooling region about the processor module; and a second fan provides airflow about the processor module;
   a user interface for enabling a user to select a desired temperature of the item in use; and
   a processor module that receives the temperature signal and controls power to the induction element for providing the desired temperature;
   wherein the temperature sensing assembly is exposed to a fan cooling path such that the temperature sensing element is selectively cooled from below.

2. The appliance according to claim 1, wherein the processor module is adapted to adjust power supplied to the temperature controlled induction element according to a heating rate, wherein the heating rate is determined by the processor module or selected by the user.

3. The appliance according to claim 2, wherein the user interface enables the user to indicate the heating rate by selecting a time period for reaching a user defined temperature.

4. The appliance according to claim 2, wherein the user interface enables the user to select the heating rate by selecting one of a plurality of predefined heating rates.

5. The appliance according to claim 2, wherein the user interface is further adapted to enable a user to select a cooking time;
the processor module, based on the selected cooking time, determines a heating rate associated with reaching the desired temperature;
the processor module receives the temperature signal and controls power to the induction element for providing the desired temperature and for controlling the heating rate; and
wherein the processor module selects a temperature profile in which a controlled heating rate for a shorter cooking time selected by the user is greater than a controlled heating rate for a longer cooking time selected by the user.

6. The appliance according to claim 1, wherein the user interface enables time control by presenting user selectable options, the user selectable options including any one or more of the following: timer option, finish time option, delay start option, stir reminder option, turn reminder option, and heating period option.

7. The appliance according to claim 1, wherein the temperature sensing assembly includes a cover element over the temperature sensing element; the cover element protrudes above an upper surface of the platform for making contact with the respective item in use; the cover element being movable with respect to the platform such that, upon presentation of the respective item in use, the cover retracts while maintaining contact with the respective item.

8. The appliance according to claim 7, wherein the cover element is sealed to the platform by an elastomer membrane.

9. The appliance according to claim 8, the temperature sensing assembly includes a piston guided by a support; a cap is located over the piston to seal the elastomer membrane there between.

10. The appliance according to claim 9, wherein the cover element is movable within a guide; the cover element being biased into a protruding configuration above the upper surface.

11. The appliance according to claim 7, wherein a sealing element is provided between the cover element and the platform.

12. The appliance according to claim 1, wherein the temperature sensing assembly includes a remote temperature probe that provides a temperature signal indicative of a current temperature of the item in use.

13. The appliance according to claim 1, wherein the first fan has a variable rate of rotation that is controlled by the processor module based on temperature sensed by the temperature sensing assembly.

14. The appliance according to claim 1, wherein the housing causes air to flow above and below the induction element.

15. The appliance according to claim 1, wherein the rate of rotation of each fan is separately controlled using feedback of a temperature signal indicative of a current temperature.

16. The appliance according to claim 1, wherein the housing is proximal to an underside of the platform, such that air flows into and is guided out of the housing.

17. The appliance according to claim 1, wherein power to the induction element is digitally controlled using real-time temperature feedback.

18. The appliance according to claim 1, wherein the temperature sensing assembly protrudes above an upper surface of the platform for making contact with the respective item in use, and is movable with respect to the platform such that, upon presentation of the respective item in use, the temperature sensing assembly retracts while maintaining thermal contact between the temperature sensing element and the respective item.

* * * * *